United States Patent
Baek et al.

(10) Patent No.: US 12,438,648 B2
(45) Date of Patent: Oct. 7, 2025

(54) TIMER OPERATING METHOD AND DEVICE ACCORDING TO HARQ ACTIVATION

(71) Applicant: Samsung Electronics Co., Ltd., Suwon-si (KR)

(72) Inventors: Sangkyu Baek, Suwon-si (KR); Soenghun Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 316 days.

(21) Appl. No.: 18/038,363

(22) PCT Filed: Dec. 24, 2021

(86) PCT No.: PCT/KR2021/019849
§ 371 (c)(1),
(2) Date: May 23, 2023

(87) PCT Pub. No.: WO2022/139551
PCT Pub. Date: Jun. 30, 2022

(65) Prior Publication Data
US 2023/0421306 A1    Dec. 28, 2023

(30) Foreign Application Priority Data
Dec. 24, 2020 (KR) .................. 10-2020-0183090

(51) Int. Cl.
H04L 1/1829 (2023.01)

(52) U.S. Cl.
CPC .......... H04L 1/1848 (2013.01); H04L 1/1864 (2013.01)

(58) Field of Classification Search
None
See application file for complete search history.

(56) References Cited

U.S. PATENT DOCUMENTS

| 10,944,516 B2 | 3/2021 | Ozturk et al. |
| 11,419,107 B2 | 8/2022 | Baek et al. |

(Continued)

FOREIGN PATENT DOCUMENTS

| KR | 10-2020-0110619 A | 9/2020 |
| KR | 10-2020-0114220 A | 10/2020 |

(Continued)

OTHER PUBLICATIONS

Mediatek Inc., Round trip delay offset for configured grant timers, R2-2008969, 3GPP TSG RAN WG2 Meeting #112-e, Online, Oct. 23, 2020.

(Continued)

*Primary Examiner* — Otis L Thompson, Jr.
(74) *Attorney, Agent, or Firm* — Jefferson IP Law, LLP

(57) ABSTRACT

The present disclosure relates to a communication technique merging IoT technology with a 5th generation (5G) or pre-5G communication system for supporting a data transmission rate higher than that of a 4th generation (4G) communication system, such as long term evolution (LTE), and a system therefor. The present disclosure can be applied to intelligent services (for example, smart homes, smart buildings, smart cities, smart cars or connected cars, healthcare, digital education, retail businesses, security- and safety-related services, and the like) on the basis of 5G communication technology and IoT-related technology. According to various embodiments of the present invention, a timer operating method and device according to HARQ activation can be provided.

15 Claims, 20 Drawing Sheets

(56) References Cited

U.S. PATENT DOCUMENTS

| | | | | |
|---|---|---|---|---|
| 11,641,570 B2* | 5/2023 | Wang | ................ | H04W 76/27 |
| | | | | 370/329 |
| 2010/0135303 A1* | 6/2010 | Umesh | ................ | H04L 1/1832 |
| | | | | 370/394 |
| 2017/0171905 A1* | 6/2017 | Uchino | ................ | H04W 36/04 |
| 2017/0303170 A1* | 10/2017 | Uchino | ................ | H04W 76/30 |
| 2020/0313804 A1 | 10/2020 | Ryu et al. | | |
| 2020/0374858 A1* | 11/2020 | Vargas | ................ | H04W 72/25 |
| 2020/0396023 A1* | 12/2020 | Wang | ................ | H04L 1/08 |
| 2021/0127448 A1* | 4/2021 | Kadiri | ................ | H04W 76/27 |
| 2022/0150730 A1* | 5/2022 | Freda | ................ | H04L 1/188 |
| 2022/0151015 A1* | 5/2022 | Lu | ................ | H04W 76/28 |

FOREIGN PATENT DOCUMENTS

| | | |
|---|---|---|
| KR | 10-2021-0024894 A | 3/2021 |
| WO | 2019/005928 A1 | 1/2019 |

OTHER PUBLICATIONS

Spreadtrum Communications, Discussion on HARQ and related timers, R2-2009140, 3GPP TSG RAN WG2 Meeting #112-e, Online, Oct. 23, 2020.

* cited by examiner

TIMER OPERATING METHOD AND DEVICE ACCORDING TO HARQ ACTIVATION

TECHNICAL FIELD

The disclosure relates to operation of a terminal and a base station in a mobile communication system.

BACKGROUND ART

In order to satisfy increases in demand for wireless data traffic now that a 4th generation (4G) communication system is commercially available, efforts are being made to develop an enhanced 5th generation (5G) communication system or a pre-5G communication system. Therefore, a 5G communication system or a pre-5G communication system is referred to as a beyond 4G network communication system or a post long term evolution (LTE) system.

In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system.

Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation are being developed.

Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

The 5G system is considering support for various services compared to the existing 4G system. For example, the most representative services may include an enhanced mobile broad band (eMBB), ultra-reliable and low latency communication (URLLC), massive machine type communication (mMTC), evolved multimedia broadcast/multicast service (eMBMS), and the like. A system providing the URLLC service may be referred to as a URLLC system, and a system providing the eMBB service may be referred to as an eMBB system. Further, terms service and system may be used interchangeably.

The URLLC service is a service newly considered in the 5G system, unlike the existing 4G system and requires ultra-high reliability (e.g., about 10-5 packet error rate) and low latency (e.g., about 0.5 msec) requirements compared to other services. In order to satisfy these strict requirements, the URLLC service may need to apply a shorter transmission time interval (TTI) than the eMBB service, and various operating methods using this are being considered.

Innovation of Internet from a human-centered connection network in which a human generates and consumes information to an Internet of Things (IoT) network that gives and receives and processes information to and from distributed constituent elements such as things has occurred. Internet of everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things.

In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network are being made. For example, technologies such as a sensor network, machine to machine (M2M), and machine type communication (MTC) have been implemented by the technique of beamforming, MIMO, and array antenna, which are communication technologies. Application of a cloud RAN as the foregoing big data processing technology may be an example of convergence of 5G technology and IoT technology.

DISCLOSURE OF INVENTION

Technical Problem

The disclosure is to reduce a delay for providing a service by providing a method and device for operating a timer according to whether hybrid automatic repeat request (HARQ) is enabled in a mobile communication system.

In particular, in case that message exchange is required between a terminal and a satellite base station, a round trip time (RTT) is required by the sum of a propagation delay from the terminal to the satellite base station and a propagation delay from the satellite base station to the terminal, and in a non-terrestrial network (NTN), a large RTT may cause degradation of a service quality. Therefore, in case that the NTN provides a service with a short delay requirement, data corresponding to these services needs to be transmitted in a way that minimizes a propagation delay or RTT.

Technical problems to be achieved in the disclosure are not limited to the above-described technical problems, and other technical problems not described may be clearly understood by those of ordinary skill in the art to which the disclosure belongs from the description below.

Solution to Problem

According to an embodiment of the disclosure for solving the above problems, a method performed by a terminal of a wireless communication system includes receiving, from a base station, a message including information on whether hybrid automatic repeat request (HARQ) feedback is activated, identifying whether the information is activation information or deactivation information, and configuring, in case that the information is the deactivation information, a first timer and a second timer of a radio link control (RLC) layer, wherein the first timer and the second timer are related to a reassembly timer of a packet, and wherein the first timer is greater than or equal to the second timer.

Further, according to another embodiment of the disclosure, a method performed by a terminal of a wireless communication system includes receiving, from a base station, a message including information on whether hybrid automatic repeat request (HARQ) feedback is activated, identifying whether the information is activation information or deactivation information, and configuring, in case that the information is the deactivation information, a first timer and a second timer of a packet data convergence protocol (PDCP) layer, wherein the first timer and the second timer are related to a reordering timer of a packet, and wherein the first timer is greater than or equal to the second timer.

Further, according to another embodiment of the disclosure, a terminal of a wireless communication system includes a transceiver, and a controller configured to control to receive, from a base station via the transceiver, a message including information on whether hybrid automatic repeat request (HARQ) feedback is activated, to identify whether the information is activation information or deactivation information, and to configure a first timer and a second timer of a radio link control (RLC) layer in case that the information is the deactivation information, wherein the first timer and the second timer are related to a reassembly timer of a packet, and the first timer is greater than or equal to the second timer.

Further, according to another embodiment of the disclosure, a terminal of a wireless communication system includes a transceiver, and a controller configured to control to receive, from a base station, a message including information on whether hybrid automatic repeat request (HARQ) feedback is activated, to identify whether the information is activation information or deactivation information, and to configure a first timer and a second timer of a packet data convergence protocol (PDCP) layer in case that the information is the deactivation information, wherein the first timer and the second timer are related to a reordering timer of a packet, and the first timer is greater than or equal to the second timer.

Advantageous Effects of Invention

According to an embodiment of the disclosure, by providing a method and device for operating a timer according to whether hybrid automatic repeat request (HARQ) is enabled in a mobile communication system, a delay for providing a service can be reduced.

Effects obtainable in the disclosure are not limited to the above-described effects, and other effects not described may be clearly understood by those of ordinary skill in the art to which the disclosure belongs from the description below.

MODE FOR THE INVENTION

In the following description, in describing the disclosure, in case that it is determined that a detailed description of a related well-known function or constitution may unnecessarily obscure the gist of the disclosure, a detailed description thereof will be omitted. Hereinafter, embodiments of the disclosure will be described with reference to the accompanying drawings.

Figure 1:
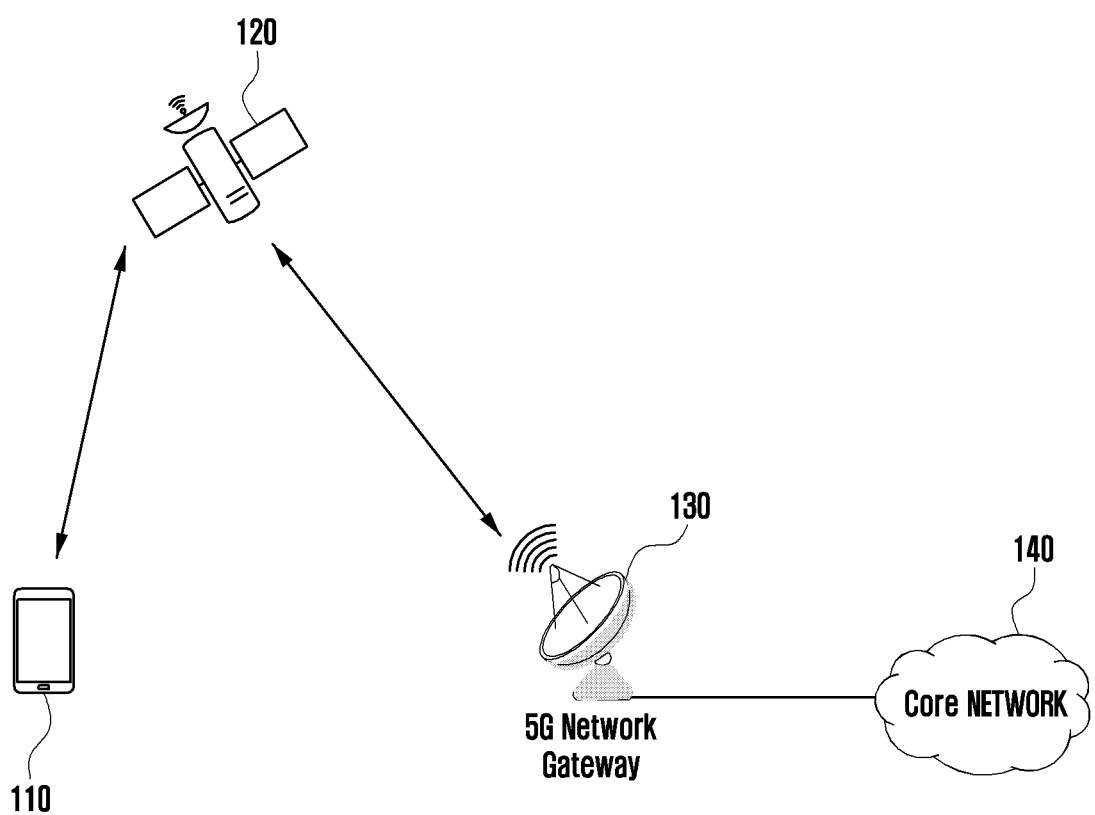
FIG. 1 is a diagram illustrating a structure of a non-terrestrial network performing mobile communication using satellites according to an embodiment of the disclosure.

FIG. 1 is a diagram illustrating a structure of a non-terrestrial network performing mobile communication using satellites according to an embodiment of the disclosure.

With reference to FIG. 1, in a 5G mobile communication (5G) system, in case that a mobile communication UE 110 is not in the coverage of a base station located on the ground or that it is difficult for a base station located on the ground to provide a communication service, the mobile communication UE 110 may perform communication with a satellite base station 120. A network that provides communication services through artificial satellites not located on the ground is referred to as a non-terrestrial network (NTN). In the NTN, the satellite 120 may serve independently as a base station or may serve to relay signals of a 5G network gateway 130 serving as a base station on the ground, and an actual role of the satellite may differ according to a structure of the NTN. The 5G network gateway may be connected to a core network 140 to transmit data from the core network and external networks to the UE or transmit data from the UE to the core network and external networks. The satellite 120 used in the NTN should be equipped with a 5G communication modem to enable wireless communication with the UE, and in this case, it may be referred to as a satellite base station. Because these artificial satellites are thousands of kilometers (km) to tens of thousands of kilometers away from the ground, radio waves transmitted between the UE 110 and the satellite 120 have a longer propagation delay than that of a terrestrial network (TN). In case that message exchange is required between the UE and the satellite base station, a round trip time (RTT) is required by the sum of a propagation delay from the UE to the satellite base station and a propagation delay from the satellite base station to the UE, and in the NTN, degradation of a service quality may occur due to a large RTT. Therefore, in case that the NTN provides a service with a short delay requirement, data corresponding to these services needs to be transmitted in a way that minimizes a propagation delay or RTT.

Figure 2:
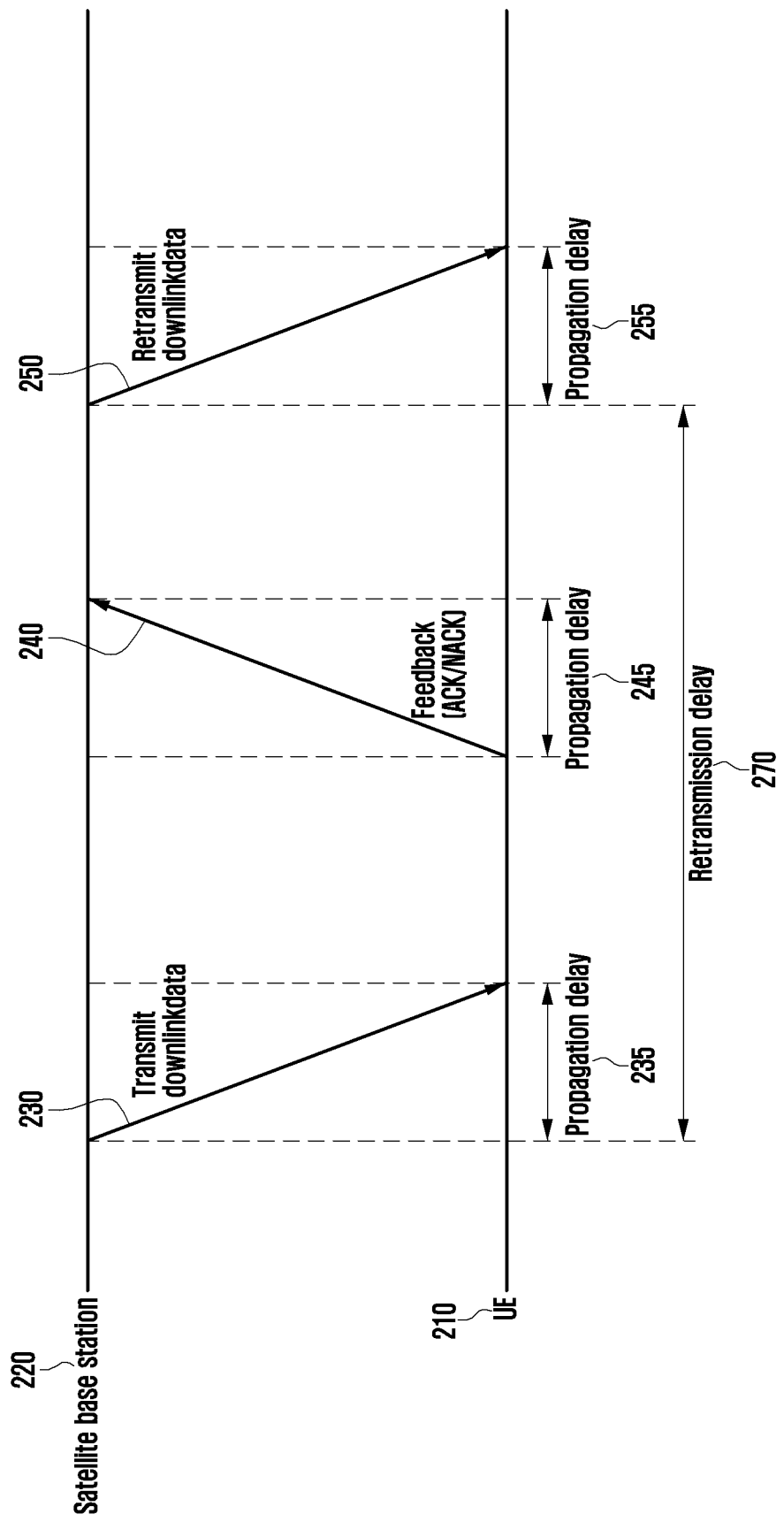
FIG. 2 is a diagram illustrating an example of occurrence of a retransmission delay due to downlink retransmission in a non-terrestrial network (NTN) according to an embodiment of the disclosure.

FIG. 2 is a diagram illustrating an example of occurrence of a retransmission delay due to downlink retransmission in a non-terrestrial network (NTN) according to an embodiment of the disclosure.

A downlink refers to a radio link transmitted from a base station 220 to a UE 210. In the NTN, a radio link transmitted from a satellite base station 220 to the UE 210 or a radio link transmitted from a 5G network gateway connected to the satellite base station 220 to serve as a base station to the UE 210 via the satellite base station 220 may be referred to as a downlink.

In case that the satellite base station 220 transmits downlink data to the UE 210 (230), a time point at which the UE receives the data is a time point at which a propagation delay 235 has elapsed at a time point at which the base station transmitted the data. Thereafter, the UE transmits a feedback 240 message indicating whether downlink transmission has been successfully received. Because the feedback message is generated in a hybrid automatic repeat request (HARQ) process, it may be referred to as HARQ feedback. Because the feedback message is also a message transmitted from the UE 210 to the satellite base station 220, it is transmitted to the satellite base station 220 after a time corresponding to a propagation delay 245 has elapsed. In the NTN, due to long propagation delays 235, 245, and 255, a retransmission delay 270 including the propagation delay also becomes long. The retransmission delay may also be referred to as a retransmission round trip time (RTT). In case that a feedback message transmitted by the UE to the satellite base station indicates a transmission failure or that a feedback message is not transmitted well, the satellite base station may retransmit downlink data (250). The retransmitted message also arrives at the UE after a time corresponding to the propagation delay (255) has elapsed. In this way, in the NTN, a retransmission delay becomes long due to a long propagation delay, and a long retransmission time may cause performance degradation in the case of data having short delay requirements. In other words, a feedback message may be transmitted and performing retransmission may be unnecessary in terms of delay requirements. In this way, in case that a time required for downlink retransmission by the feedback message is too long to satisfy the delay requirements, a feedback message of a specific downlink transmission may not be transmitted. As described, because the feedback message is generated in a HARQ process, whether to transmit a feedback message per each HARQ process may be configured. Whether to transmit such a feedback message may be transmitted in a medium access control-control element (MAC CE) format or a downlink control information (DCI) format.

In FIG. 2, downlink transmission between the satellite base station and the UE is exemplified, but even if the satellite base station is replaced with a 5G network gateway, the propagation delay is changed to the sum of a propagation delay between the satellite base station and the UE and a propagation delay between the satellite base station and the 5G network gateway, but the phenomenon that a retransmission delay increases may be described in the same way.

Figure 3:
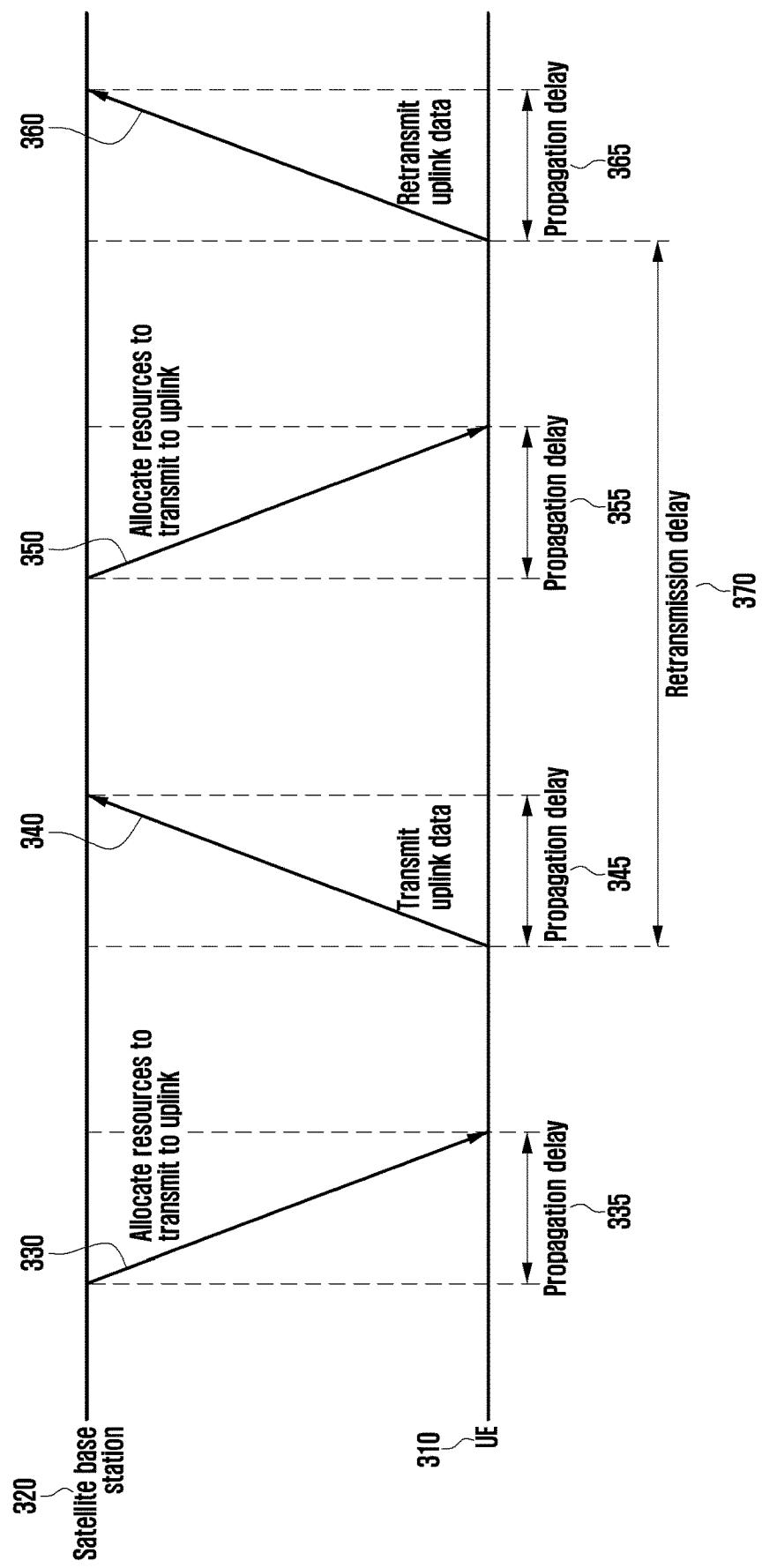
FIG. 3 is a diagram illustrating an example of occurrence of a retransmission delay due to uplink retransmission in an NTN according to an embodiment of the disclosure.

FIG. 3 is a diagram illustrating an example of occurrence of a retransmission delay due to uplink retransmission in an NTN according to an embodiment of the disclosure.

An uplink refers to a radio link transmitted from a UE 310 to the base station. In the NTN, a radio link transmitted from the UE 310 to a satellite base station 320 or a radio link transmitted from the UE to a 5G network gateway connected to the satellite base station to serve as a base station via the satellite base station may be referred to as an uplink.

To transmit uplink data, the satellite base station 320 may first allocate resources to transmit to uplink to the UE 310 (330). This may be transmitted in a DCI format of a physical downlink control channel (PDCCH), and the UE that has decoded contents of the DCI may know a position and detailed information of a radio resource in which actual uplink transmission will occur. A time point at which the UE receives uplink resource allocation information 330 is a time point at which a propagation delay 335 has elapsed at a time point at which the base station transmitted the information. Thereafter, in case that the UE 310 transmits uplink data to the satellite base station 320 (340), a time point at which the satellite base station 320 receives data is a time point at which a propagation delay 335 has elapsed at a time point at which the UE 310 transmitted the data. In case that the base station 320 does not successfully receive uplink data, the base station 320 may allocate uplink resources for retransmission (350). Uplink resource allocation information for retransmission may be also transmitted in a DCI format of a physical downlink control channel (PDCCH), and the UE 310 that has decoded contents of the DCI may know a position and detailed information of a radio resource in which actual uplink transmission will occur. A time point at which the UE 310 receives uplink resource allocation information 350 is a time point at which a propagation delay 355 has elapsed at a time point at which the satellite base station 320 transmitted the information. Thereafter, in case that the UE 310 transmits uplink data for retransmission to the satellite base station 320 (360), a time point at which the satellite base station 320 receives the data is a time point at which a propagation delay 365 has elapsed at a time point at which the UE 310 transmits the data. In the NTN, a retransmission delay 370 including the propagation delay also becomes long due to the long propagation delays 335, 345, 355, and 365. The retransmission delay is also referred to as a retransmission round trip time (RTT). In the NTN, the retransmission delay becomes long due to the long propagation delay, and a long retransmission time may cause performance degradation in the case of data having short delay requirements. In other words, as the base station allocates uplink radio resources for retransmission, it may be unnecessary for the UE to perform retransmission in terms of delay requirements. In this way, in case that a time required for uplink retransmission is too large to satisfy the delay requirements, specific uplink retransmission may not be performed. Because such uplink retransmission occurs per each HARQ process in a HARQ process, the base station may configure the UE to perform uplink retransmission per each HARQ process. A configuration message on whether to perform such uplink retransmission may be transmitted in a medium access control-control element (MAC CE) format or a downlink control information (DCI) format.

In FIG. 3, uplink transmission between the satellite base station and the UE is exemplified, but even if the satellite base station is replaced with a 5G network gateway, the propagation delay is changed to the sum of a propagation delay between the satellite base station and the UE and a propagation delay between the satellite base station and the 5G network gateway, but the phenomenon that the retransmission delay increases may be described in the same way.

Figure 4:
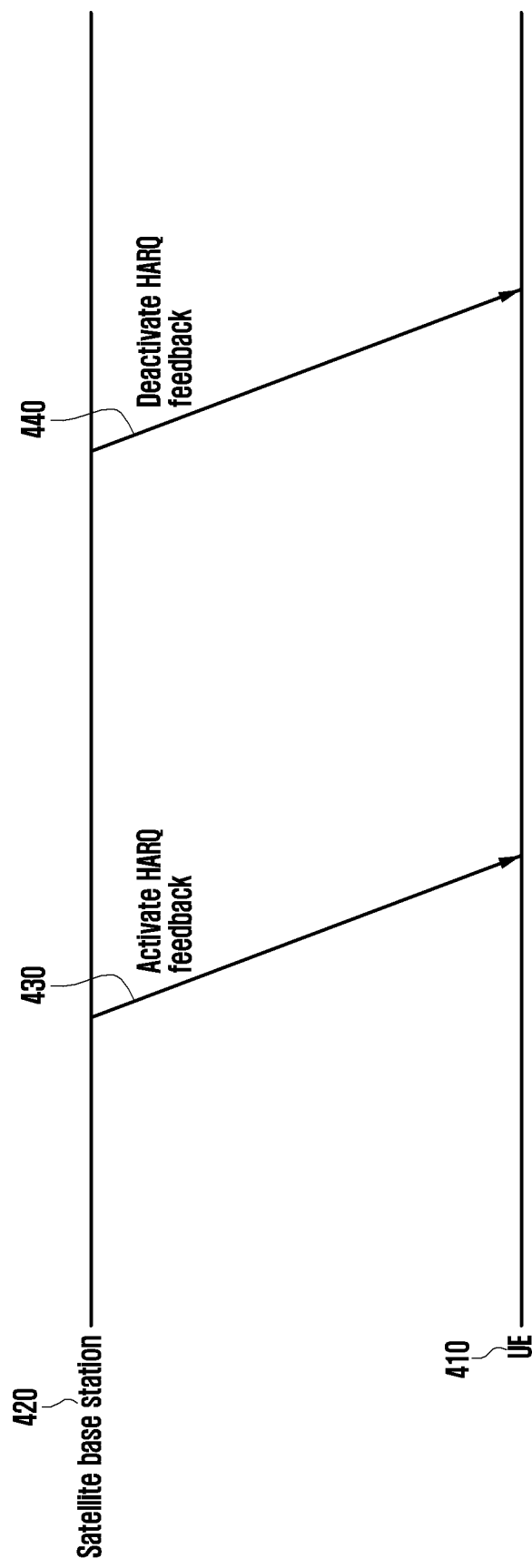
FIG. 4 is a diagram illustrating operation of transmitting an activation message and a deactivation message of a feedback message in an NTN according to an embodiment of the disclosure.

FIG. 4 is a diagram illustrating operation of transmitting an activation message and a deactivation message of a feedback message in an NTN according to an embodiment of the disclosure.

In the NTN, a retransmission delay becomes long due to a long propagation delay, and a long retransmission time may cause performance degradation in the case of data having short delay requirements. Therefore, in case that a time required for downlink retransmission by a feedback message is too long to satisfy the delay requirements, a feedback message of specific downlink transmission may not be transmitted. Conversely, in case that a time required for downlink retransmission by a feedback message satisfies the delay requirement, a feedback message of downlink transmission is transmitted, and the satellite base station may perform downlink retransmission based on this.

According to an embodiment of FIG. 4, the fact that the UE transmits a downlink transmission feedback message (HARQ feedback) to the base station is referred to as activation of the feedback message, and the fact that the UE does not transmit a feedback message to the base station is referred to as deactivation of the feedback message. An activation message 430 or a deactivation message 440 of the feedback message may be transmitted from the satellite base station to the UE to configure an operation of the UE, and may be transmitted in a MAC CE format or DCI format. Further, in case that configuring a MAC entity, activation or deactivation of a feedback message may also be configured by a radio resource control (RRC) message. A UE 410 that has received the activation message 430 of the feedback message from a satellite base station 420 may transmit a feedback message for downlink transmission. Otherwise, the UE 410 that has received the deactivation message 430 of the feedback message from the satellite base station 420 does not transmit the feedback message for downlink transmission. Further, the activation and deactivation message of the feedback message may be configured per each HARQ process, and the UE may determine whether to transmit the feedback message according to whether the feedback message is enabled per each HARQ process.

Figure 5:
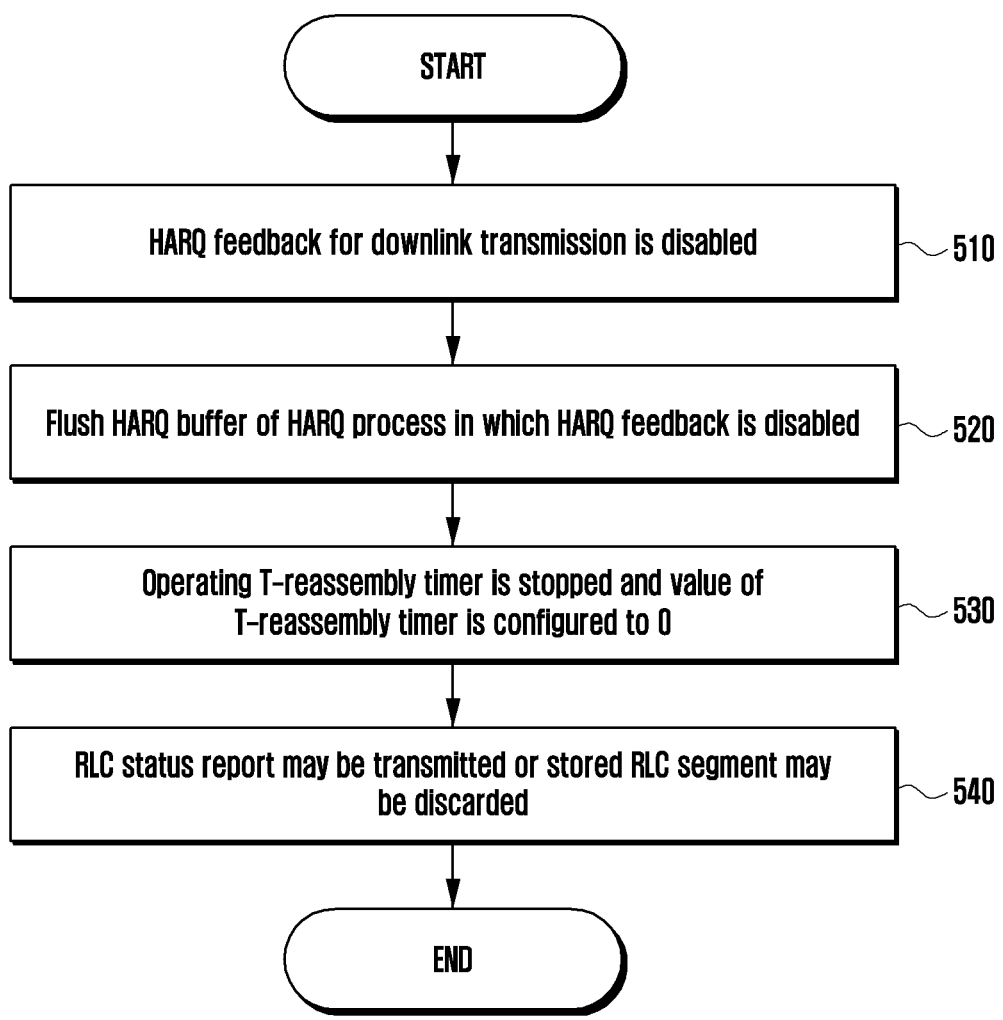
FIG. 5 is a flowchart illustrating a radio link control (RLC) layer operation sequence in case that hybrid automatic repeat request (HARQ) feedback for downlink transmission is disabled according to an embodiment of the disclosure.

FIG. 5 is a flowchart illustrating a radio link control (RLC) layer operation sequence in case that hybrid automatic repeat request (HARQ) feedback for downlink transmission is disabled according to an embodiment of the disclosure.

In the NTN, a long retransmission delay is assumed due to a long propagation delay, and a length of a T-reassembly (reassembly) timer of an RLC layer may be configured long due to such a long retransmission delay. However, in case that HARQ feedback for downlink transmission is disabled, retransmission with a long retransmission delay does not occur; thus, a long T-reassembly timer length is not required. In case that HARQ feedback for downlink transmission is disabled (510), the UE may perform an operation of flushing a HARQ buffer of a HARQ process in which HARQ feedback is disabled (520). This is because retransmission of data stored in the HARQ buffer does not occur so that the data is no longer needed. In case that HARQ feedback is disabled, retransmission with a long retransmission delay may no longer occur. Therefore, because there is no need to operate any longer the operating T-reassembly timer, the operating T-reassembly timer may be stopped and a value of the T-reassembly timer may be configured to 0 (530). Further, configuring the value of the T-reassembly timer to 0 means that the T-reassembly timer expires immediately after starting. The UE may transmit an RLC status report message indicating a packet reception/non-reception status in order to transmit a reception status of an RLC layer thereof to the base station. Because an RLC segment (partially divided RLC service data units (SDU)) stored in an RLC buffer may not be used any more, it may be discarded (540).

Figure 6:
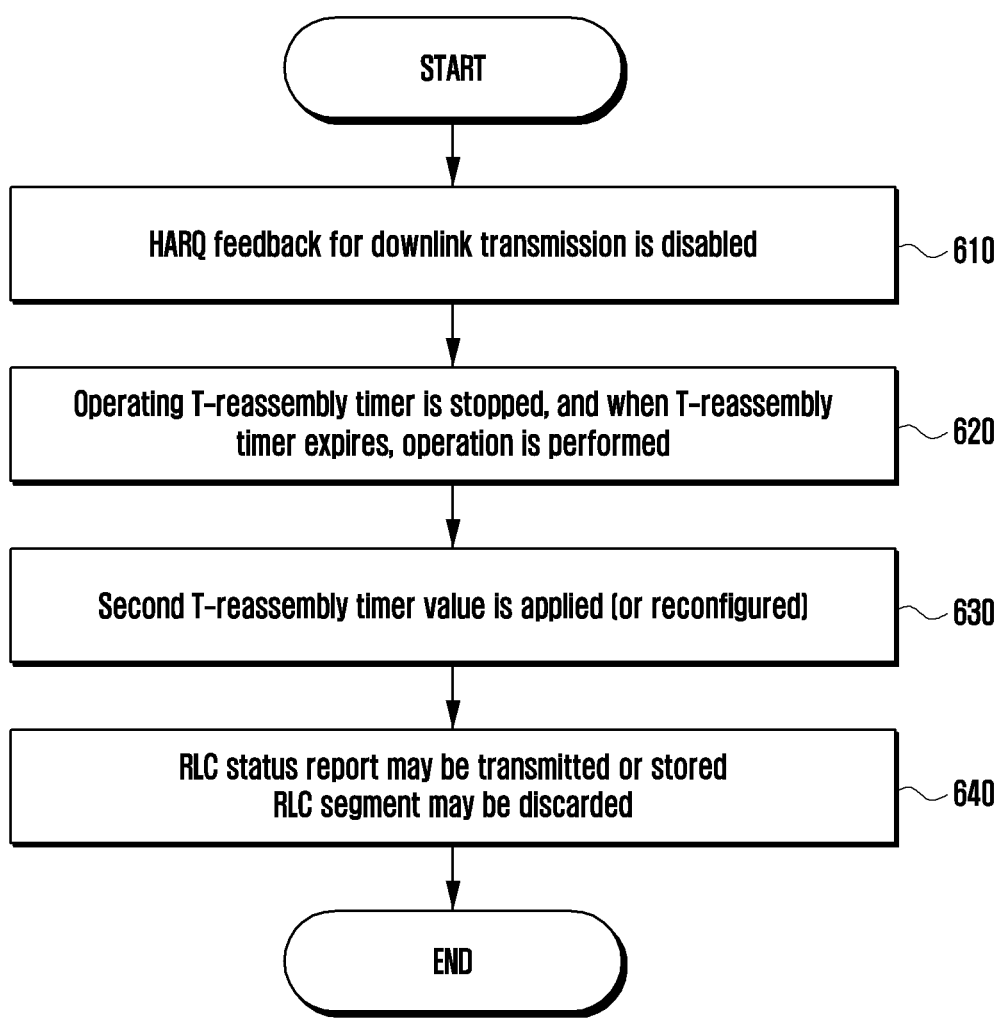
FIG. 6 is a flowchart illustrating an RLC layer operation sequence in case that HARQ feedback for downlink transmission is disabled according to an embodiment of the disclosure.

FIG. 6 is a flowchart illustrating an RLC layer operation sequence in case that HARQ feedback for downlink transmission is disabled according to an embodiment of the disclosure.

In the NTN, a long retransmission delay is assumed due to a long propagation delay, and a length of a T-reassembly timer of the RLC layer may be configured long due to such a long retransmission delay. However, in case that HARQ feedback for downlink transmission is disabled, retransmission with a long retransmission delay does not occur; thus, a long T-reassembly timer length is not required, and a relatively short T-reassembly timer length is sufficient. In case that HARQ feedback for downlink transmission is disabled (610), retransmission having a long retransmission delay may no longer occur. Therefore, in order to apply a shorter T-reassembly timer length than the operating T-reassembly timer, the operating T-reassembly timer may be stopped, and in case that the T-reassembly timer expires, an operation of the shorter T-reassembly timer may be performed (620).

As an operation in case that the T-reassembly timer expires, in the case of unacknowledged mode (UM) RLC, a value of an RX_Next Reassebmly status variable is updated to a value of a first sequence number (SN) that is greater than or equal to RX_Timer_Trigger without being reassembled yet, and all SN segments smaller than the updated RX_Next_Reassembly value are discarded. Further, in case that RX_Next_Highest is greater than a value obtained by adding 1 to RX_Next_Reassembly, or that RX_Next_Highest is equal to a value obtained by adding 1 to RX_Next_Reassembly, and that there is an unreceived segment with an SN of RX_Next_Reassembly, the T-reassembly timer may be started and the RX_Timer_Trigger status variable may be configured to RX_Next_Highest.

As an operation in case that the T-reassembly timer expires, in the case of acknowledged mode (AM) RLC, a value of the RX_Highest_Status status variable may be updated to an SN of a first RLC SDU having an SN greater than RX_Next_Status_Trigger that does not receive all bytes. Further, in case that RX_Next_Highest is greater than a value obtained by adding 1 to RX_Highest_Status, or that RX_Next_Highest is equal to a value obtained by adding 1 to RX_Highest_Status and that there is an unreceived segment with an SN of RX_Highest_Status, the T-reassembly timer may be started and the RX_Next_Status_Trigger status variable may be configured to RX_Next_Highest.

In the embodiment of FIG. 6, it may be assumed that the UE has two T-reassembly timer values. In case that HARQ feedback for downlink transmission is enabled, a first T-reassembly timer value having a relatively long time length may be applied. In case that HARQ feedback for downlink transmission is disabled, a second T-reassembly timer value having a relatively short time length may be applied. The first T-reassembly timer value and the second T-reassembly timer value may be transmitted by an RRC configuration message transmitted from the base station to the UE. Therefore, in the embodiment of FIG. 6, because it is assumed that HARQ feedback for downlink transmission is disabled, the second T-reassembly timer value may be applied (or reconfigured) (630). In order to transmit a reception status of the RLC layer of the UE to the base station, the UE may transmit an RLC status report message indicating a packet reception/non-reception status. Because an RLC segment (partially divided RLC service data unit (SDU)) stored in an RLC buffer may not be used any more, it may be discarded (640).

Figure 7:
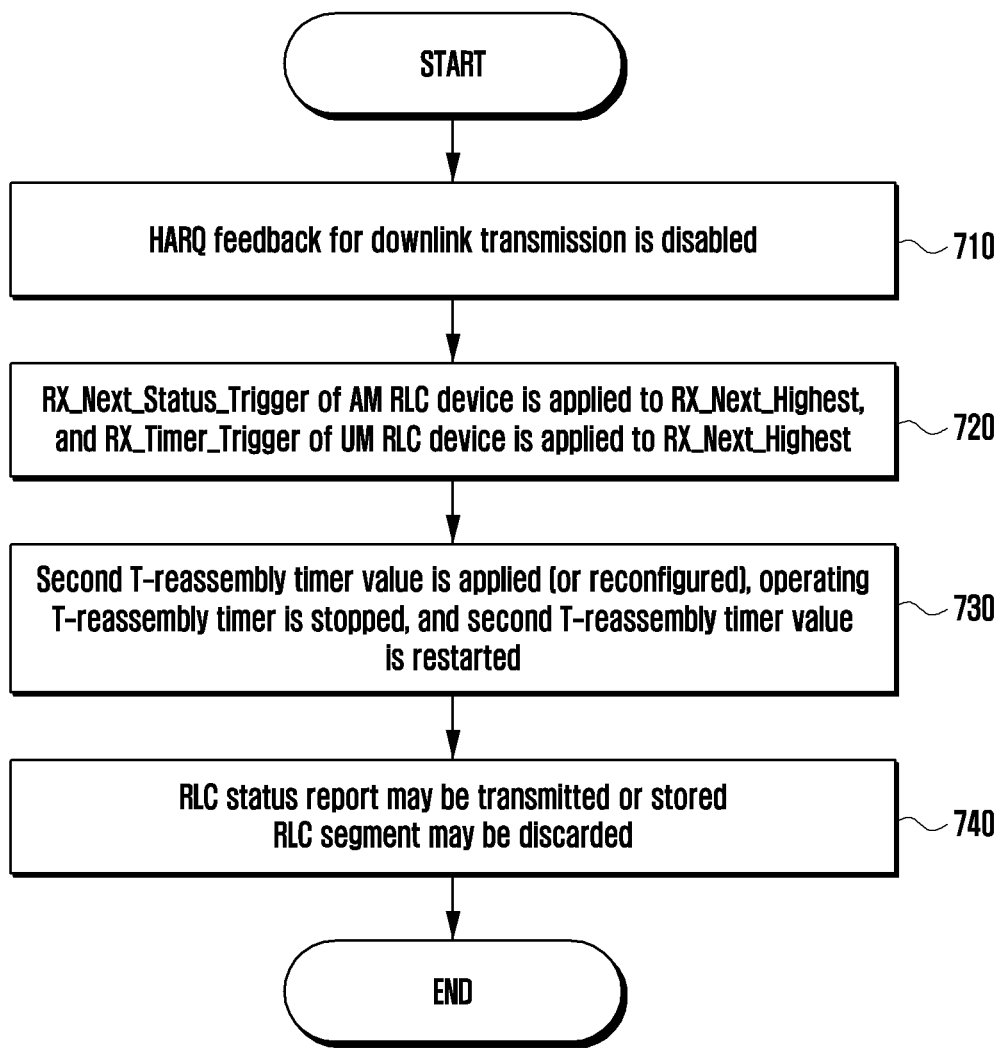
FIG. 7 is a flowchart illustrating an RLC layer operation sequence in case that HARQ feedback for downlink transmission is disabled according to an embodiment of the disclosure.

FIG. 7 is a flowchart illustrating an RLC layer operation sequence in case that HARQ feedback for downlink transmission is disabled according to an embodiment of the disclosure.

In the NTN, a long retransmission delay is assumed due to a long propagation delay, and a length of a T-reassembly timer of the RLC layer may be configured long due to such a long retransmission delay. However, in case that HARQ feedback for downlink transmission is disabled, retransmission with a long retransmission delay does not occur; thus, a long T-reassembly timer length is not required, and a relatively short T-reassembly timer length may be sufficient. In case that HARQ feedback for downlink transmission is disabled in this way (710), retransmission having a long retransmission delay may not occur any more. Therefore, in order to apply a shorter T-reassembly timer length than the operating T-reassembly timer, the operating T-reassembly timer may be stopped, and an RX_Next_Status_Trigger status variable value of an AM RLC device may be applied to RX_Next_Highest, and an RX_Timer_Trigger status variable value of an UM RLC device may be applied to RX_Next_Highest (720).

In the embodiment of FIG. 7, it may be assumed that the UE has two T-reassembly timer values. In case that HARQ feedback for downlink transmission is enabled, a first T-reassembly timer value having a relatively long time length is applied. In case that HARQ feedback for downlink transmission is disabled, a second T-reassembly timer value having a relatively short time length is applied. The first T-reassembly timer value and the second T-reassembly timer value may be transmitted by an RRC configuration message transmitted from the base station to the UE. Therefore, in the embodiment of FIG. 7, because it is assumed that HARQ feedback for downlink transmission is disabled, a second T-reassembly timer value may be applied (or reconfigured), the operating T-reassembly timer may be stopped, and the T-reassembly timer to which the second T-reassembly timer value is applied may be restarted (730). In order to transmit a reception status of an RLC layer of the UE to the base station, the UE may transmit an RLC status report message indicating a packet reception/non-reception status. Because an RLC segment (partially divided RLC service data units (RLC SDUs)) stored in an RLC buffer may not be used any more, it may be discarded (740).

Figure 8:
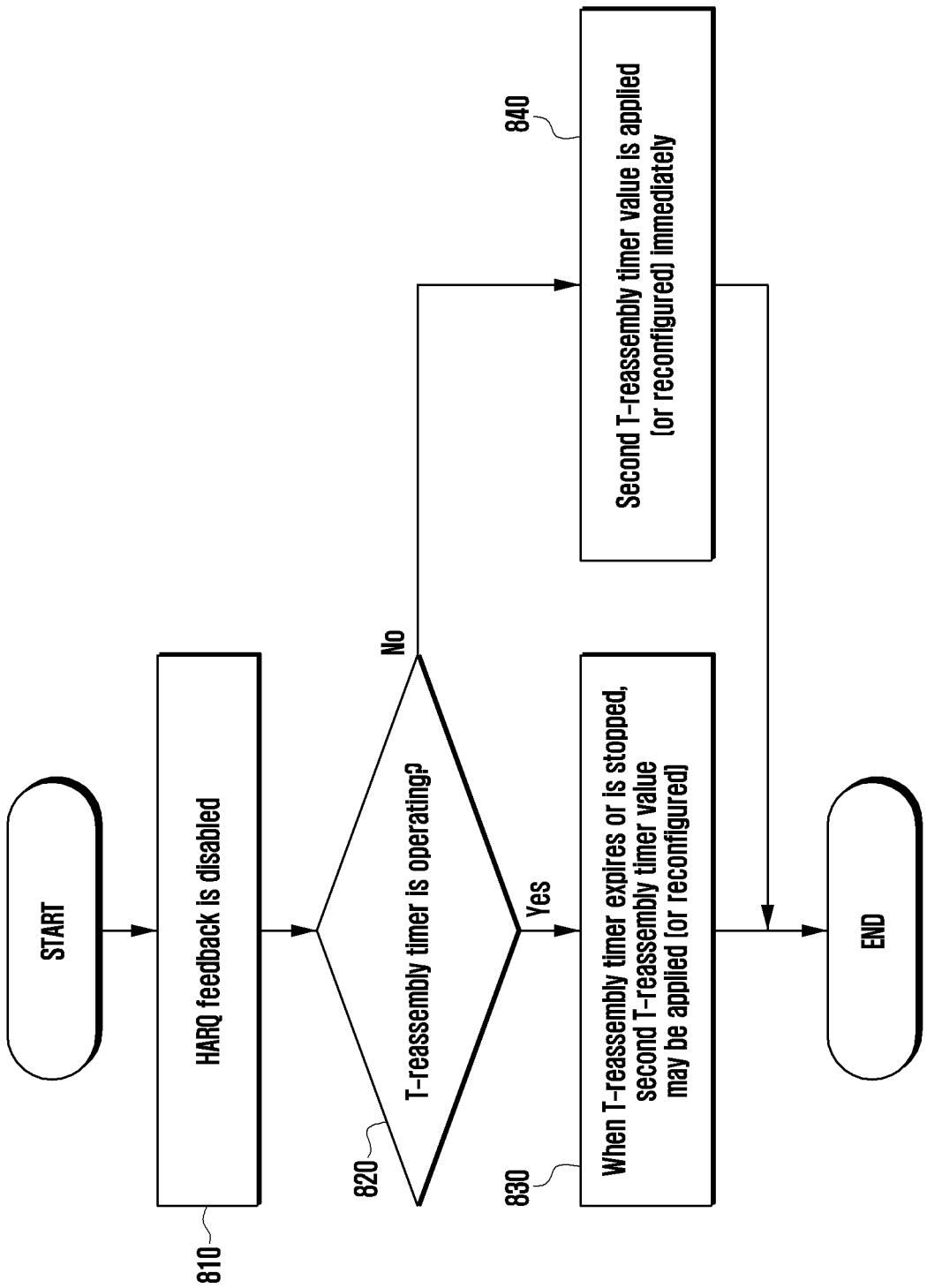
FIG. 8 is a flowchart illustrating a method of applying a T-reassembly timer value in case that HARQ feedback for downlink transmission is disabled according to an embodiment of the disclosure.

FIG. 8 is a flowchart illustrating a method of applying a T-reassembly timer value in case that HARQ feedback for downlink transmission is disabled according to an embodiment of the disclosure.

In the embodiment of FIG. 8, it may be assumed that the UE has two T-reassembly timer values. In case that HARQ feedback for downlink transmission is enabled, a first T-reassembly timer value having a relatively long time length may be applied. In case that HARQ feedback for downlink transmission is disabled, a second T-reassembly timer value having a relatively short time length may be applied. The first T-reassembly timer value and the second T-reassembly timer value may be transmitted by an RRC configuration message transmitted from the base station to the UE. However, a time point of applying the second T-reassembly timer may vary according to whether the T-reassembly timer is operating (820) at a time point at which HARQ feedback is disabled (810). If the T-reassembly timer is operating at the time point at which HARQ feedback for downlink transmission is disabled, in case that the operating T-reassembly timer expires or is stopped, the second T-reassembly timer value may be applied (or reconfigured) (830). Otherwise, if the T-reassembly timer is not operating at the time point at which HARQ feedback for downlink transmission is disabled, the second T-reassembly timer value may be applied (or reconfigured) immediately (840).

Figure 9:
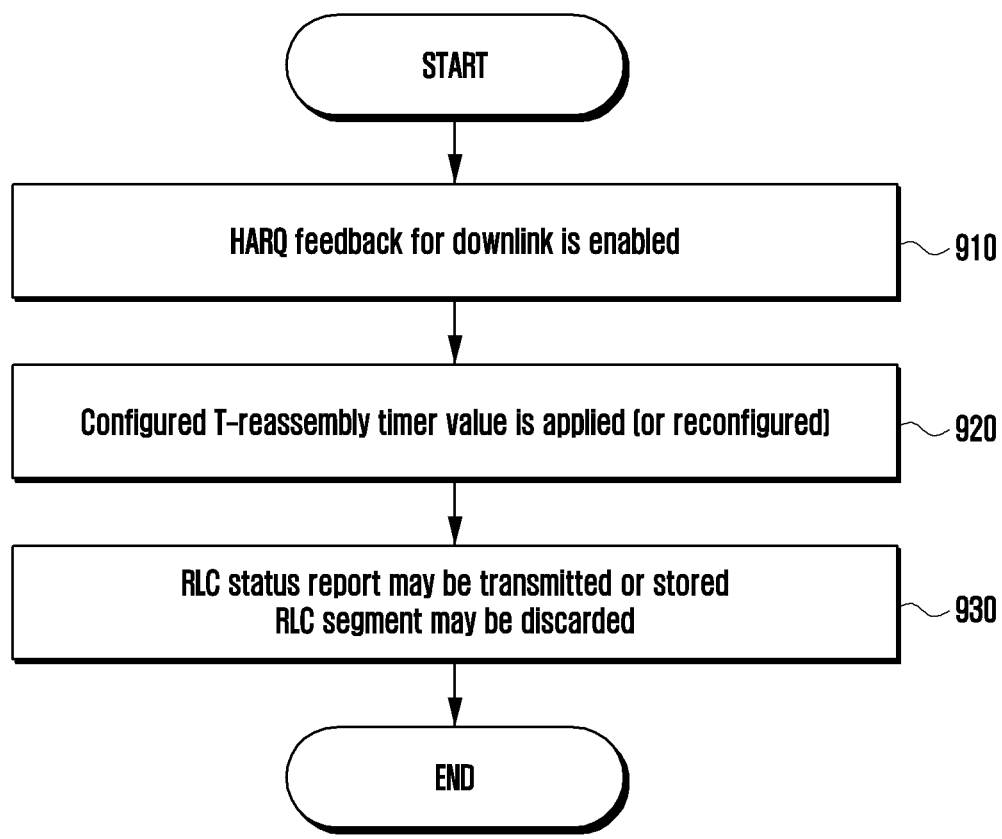
FIG. 9 is a flowchart illustrating an RLC layer operation sequence in case that HARQ feedback for downlink transmission is enabled according to an embodiment of the disclosure.

FIG. 9 is a flowchart illustrating an RLC layer operation sequence in case that HARQ feedback for downlink transmission is enabled according to an embodiment of the disclosure.

In the NTN, a long retransmission delay may be assumed due to a long propagation delay, and a length of a T-reassembly timer of the RLC layer may be configured long due to such a long retransmission delay. However, in case that HARQ feedback for downlink transmission is disabled, retransmission with a long retransmission delay does not occur; thus, a long T-reassembly timer length is not required. Therefore, only in case that HARQ feedback for downlink transmission is enabled, a long T-reassembly timer may be applied. In case that HARQ feedback for downlink transmission is enabled (910), the configured T-reassembly timer value may be applied (or reconfigured). Thereafter, in case that the T-reassembly timer is started (920), the timer may be started by the configured T-reassembly timer value. In order to transmit a reception status of the RLC layer of the UE to the base station, the UE may transmit an RLC status report message indicating a packet reception/non-reception status.

Because an RLC segment (partially divided RLC service data units (SDU)) stored in an RLC buffer may not be used any more, it may be discarded (930).

Figure 10:
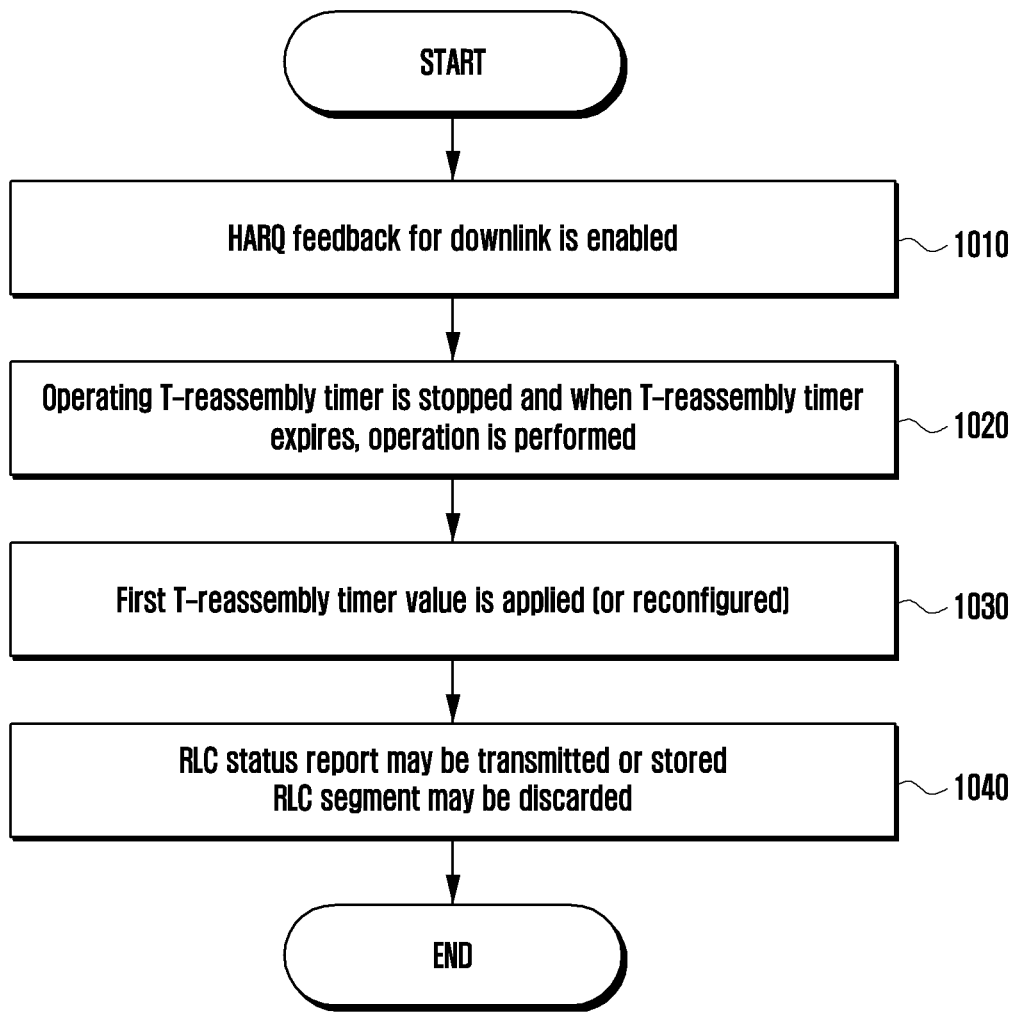
FIG. 10 is a flowchart illustrating an RLC layer operation sequence in case that HARQ feedback for downlink transmission is enabled according to an embodiment of the disclosure.

FIG. 10 is a flowchart illustrating an RLC layer operation sequence in case that HARQ feedback for downlink transmission is enabled according to an embodiment of the disclosure.

In the NTN, a long retransmission delay may be assumed due to a long propagation delay. In case that HARQ feedback for downlink transmission is enabled due to such a long retransmission delay, a length of a T-reassembly timer of the RLC layer may be configured long. However, in case that HARQ feedback for downlink transmission is disabled, retransmission with a long retransmission delay does not occur; thus, a long T-reassembly timer length is not required, and a relatively short T-reassembly timer length may be sufficient. In case that HARQ feedback for downlink transmission is enabled (1010), because retransmission with a long retransmission delay will occur, in order to apply a length of a longer T-reassembly timer than the operating T-reassembly timer, the operating T-reassembly timer may be stopped and in case that the T-reassembly timer expires, an operation of the longer T-reassembly timer may be performed (1020).

As an operation in case that the T-reassembly timer expires, in case of UM RLC, a value of the RX_Next_Reassembly status variable is updated to a value of a first sequence number (SN) that is greater than or equal to RX_Timer_Trigger without being reassembled yet, and all SN segments smaller than the updated RX_Next_Reassembly value are discarded. Further, in case that RX_Next_Highest is greater than a value obtained by adding 1 to RX_Next_Reassembly, or that RX_Next_Highest is equal to a value obtained by adding 1 to RX_Next_Reassembly, and that there is an unreceived segment with an SN of RX_Next_Reassembly, the T-reassembly timer may be started and the RX_Timer_Trigger status variable may be configured to RX_Next_Highest.

As an operation in case that the T-reassembly timer expires, in case of AM RLC, a value of the RX_Highest_Status status variable may be updated to an SN of a first RLC SDU having an SN greater than RX_Next_Status_Trigger that did not receive all bytes. Further, in case that RX_Next_Highest is greater than a value obtained by adding 1 to RX_Highest_Status, or that RX_Next_Highest is equal to a value obtained by adding 1 to RX_Highest_Status, and that there is an unreceived segment with an SN of RX_Highest_Status, the T-reassembly timer may be started and the RX_Next_Status_Trigger status variable may be configured to RX_Next_Highest.

In the embodiment of FIG. 10, it is assumed that the UE has two T-reassembly timer values. In case that HARQ feedback for downlink transmission is enabled, a first T-reassembly timer value having a relatively long time length is applied. In case that HARQ feedback for downlink transmission is disabled, a second T-reassembly timer value having a relatively short time length is applied. The first T-reassembly timer value and the second T-reassembly timer value may be transmitted by an RRC configuration message transmitted from the base station to the UE. In the embodiment of FIG. 10, because it is assumed that HARQ feedback for downlink transmission is enabled, the first T-reassembly timer value may be applied (or reconfigured) (1030). In order to transmit a reception status of the RLC layer of the UE to the base station, the UE may transmit an RLC status report message indicating a reception/non-reception status of packets. Because an RLC segment (partially divided RLC service data units (SDU)) stored in an RLC buffer may not be used any more, it may be discarded (1040).

Figure 11:
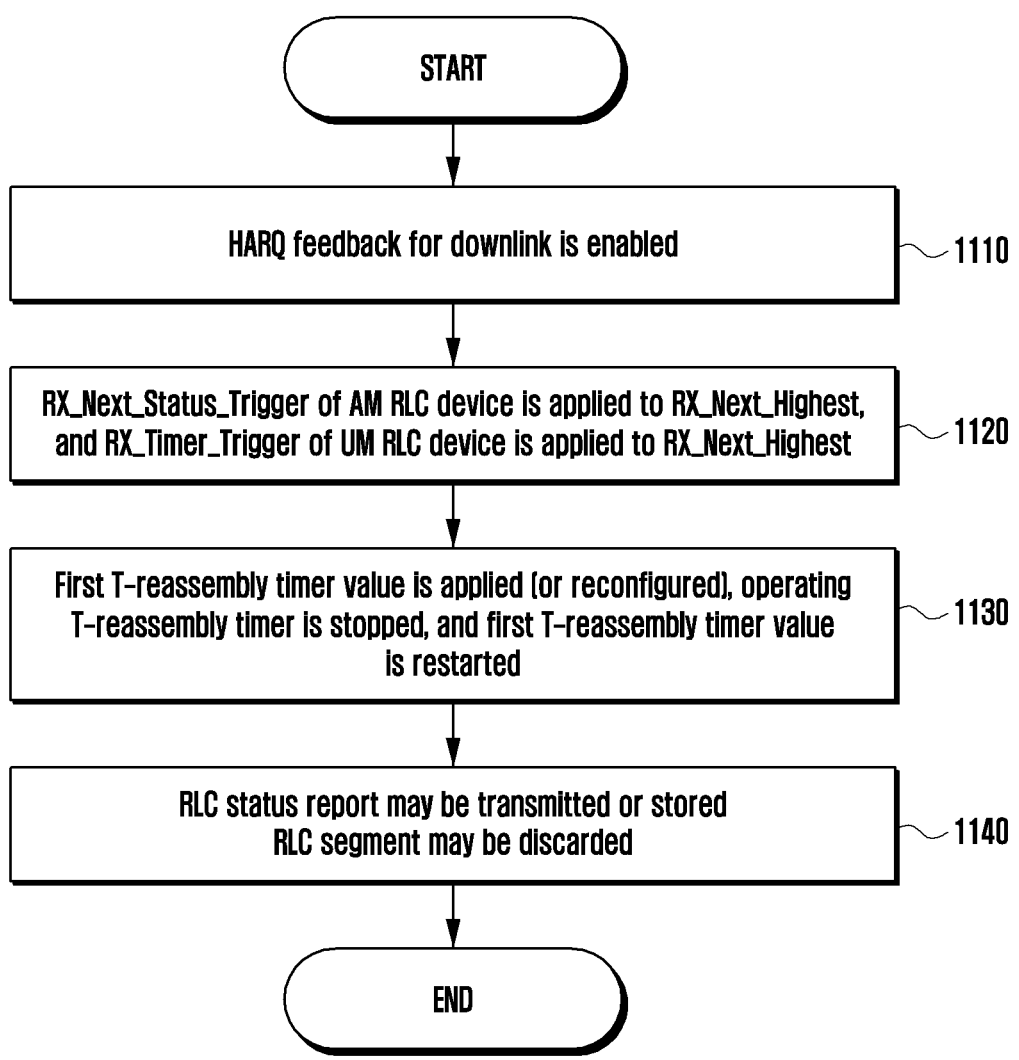
FIG. 11 is a flowchart illustrating an RLC layer operation sequence in case that HARQ feedback for downlink transmission is enabled according to an embodiment of the disclosure.

FIG. 11 is a flowchart illustrating an RLC layer operation sequence in case that HARQ feedback for downlink transmission is enabled according to an embodiment of the disclosure.

In the NTN, a long retransmission delay may be assumed due to a long propagation delay. In case that HARQ feedback for downlink transmission is enabled due to such a long retransmission delay, a length of a T-reassembly timer of the RLC layer may be configured long. However, in case that HARQ feedback for downlink transmission is disabled, retransmission with a long retransmission delay does not occur; thus, a long T-reassembly timer length is not required, and a relatively short T-reassembly timer length may be sufficient. In case that HARQ feedback for downlink transmission is enabled (1110), retransmission with a long retransmission delay may occur. Therefore, in order to apply a longer T-reassembly timer length than the operating T-reassembly timer, the operating T-reassembly timer may be stopped, and an RX_Next_Status_Trigger status variable value of an AM RLC device may be applied to RX_Next_Highest, and an RX_Timer_Trigger status variable value of an UM RLC device may be applied to RX_Next_Highest (1120).

In the embodiment of FIG. 11, it may be assumed that the UE has two T-reassembly timer values. In case that HARQ feedback for downlink transmission is enabled, a first T-reassembly timer value having a relatively long time length may be applied. In case that HARQ feedback for downlink transmission is disabled, a second T-reassembly timer value having a relatively short time length may be applied. The first T-reassembly timer value and the second T-reassembly timer value may be transmitted by an RRC configuration message transmitted from the base station to the UE. Therefore, in the embodiment of FIG. 11, because it is assumed that HARQ feedback for downlink transmission is enabled, the first T-reassembly timer value may be applied (or reconfigured), the operating T-reassembly timer may be stopped, and the T-reassembly timer to which the first T-reassembly timer value is applied may be restarted (1130). In order to transmit an RLC layer reception status of the UE to the base station, the UE may transmit an RLC status report message indicating a packet reception/non-reception status. Because an RLC segment (partially divided RLC service data units (RLC SDUs)) stored in an RLC buffer may not be used any more, it may be discarded (1140).

Figure 12:
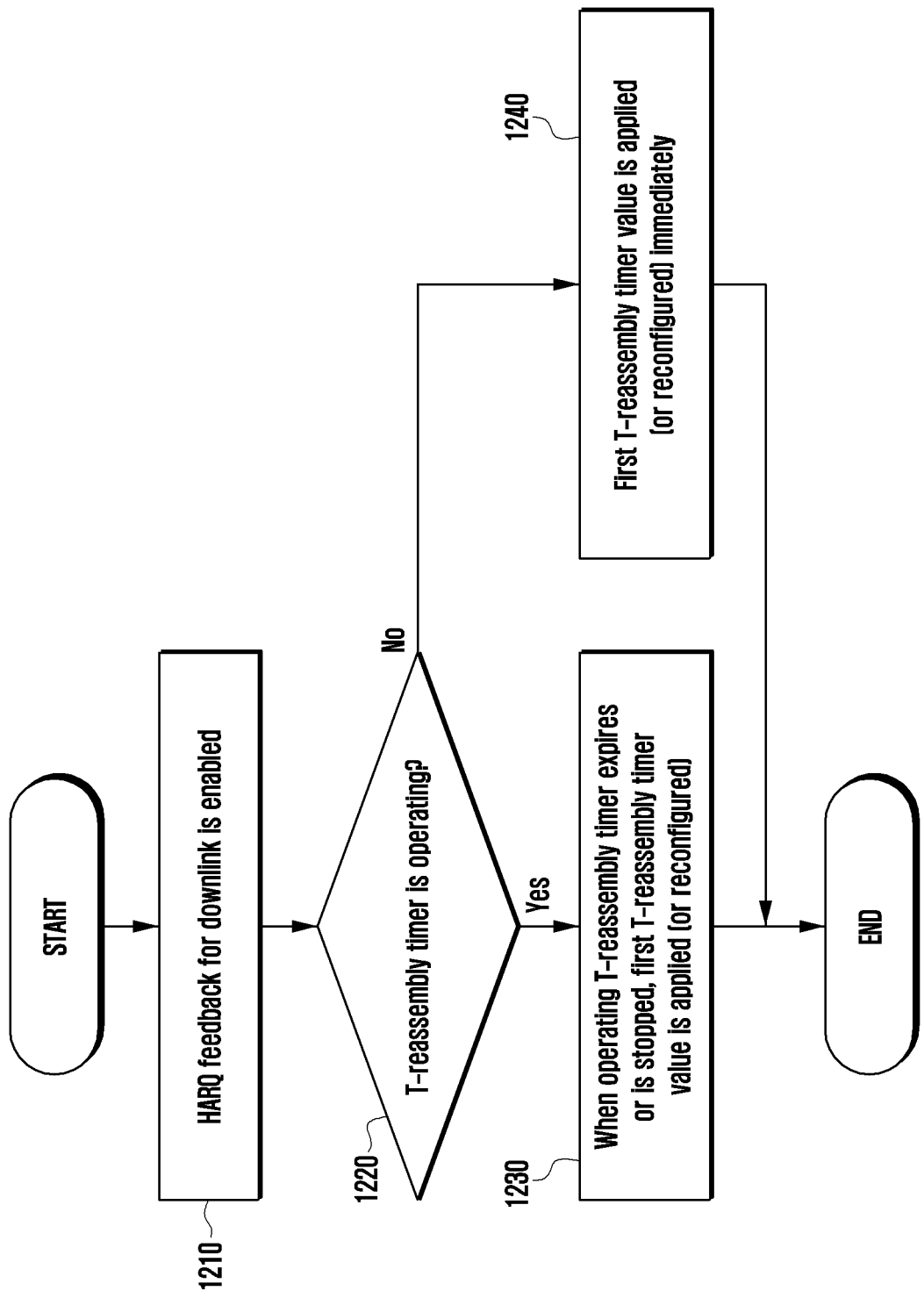
FIG. 12 is a flowchart illustrating a method of applying a T-reassembly timer value in case that HARQ feedback for downlink transmission is enabled according to an embodiment of the disclosure.

FIG. 12 is a flowchart illustrating a method of applying a T-reassembly timer value in case that HARQ feedback for downlink transmission is enabled according to an embodiment of the disclosure.

In the embodiment of FIG. 12, it may be assumed that the UE has two T-reassembly timer values. In case that HARQ feedback for downlink transmission is enabled, a first T-reassembly timer value having a relatively long time length may be applied. In case that HARQ feedback for downlink transmission is disabled, a second T-reassembly timer value having a relatively short time length may be applied. The first T-reassembly timer value and the second T-reassembly timer value may be transmitted by an RRC configuration message transmitted from the base station to the UE. However, a time point of applying the first T-reassembly timer may vary (1220) according to whether the T-reassembly timer is operating at a time point at which HARQ feedback is enabled (1210). If the T-reassembly timer is operating at a time point at which HARQ feedback for downlink transmission is enabled, in case that the operating T-reassembly timer expires or is stopped, the first T-reassembly timer value may be applied (or reconfigured) (1230). Otherwise, if the T-reassembly timer is not operating at a time point at which HARQ feedback for downlink transmission is enabled, the first T-reassembly timer value may be applied (or reconfigured) immediately (1240).

Figure 13:
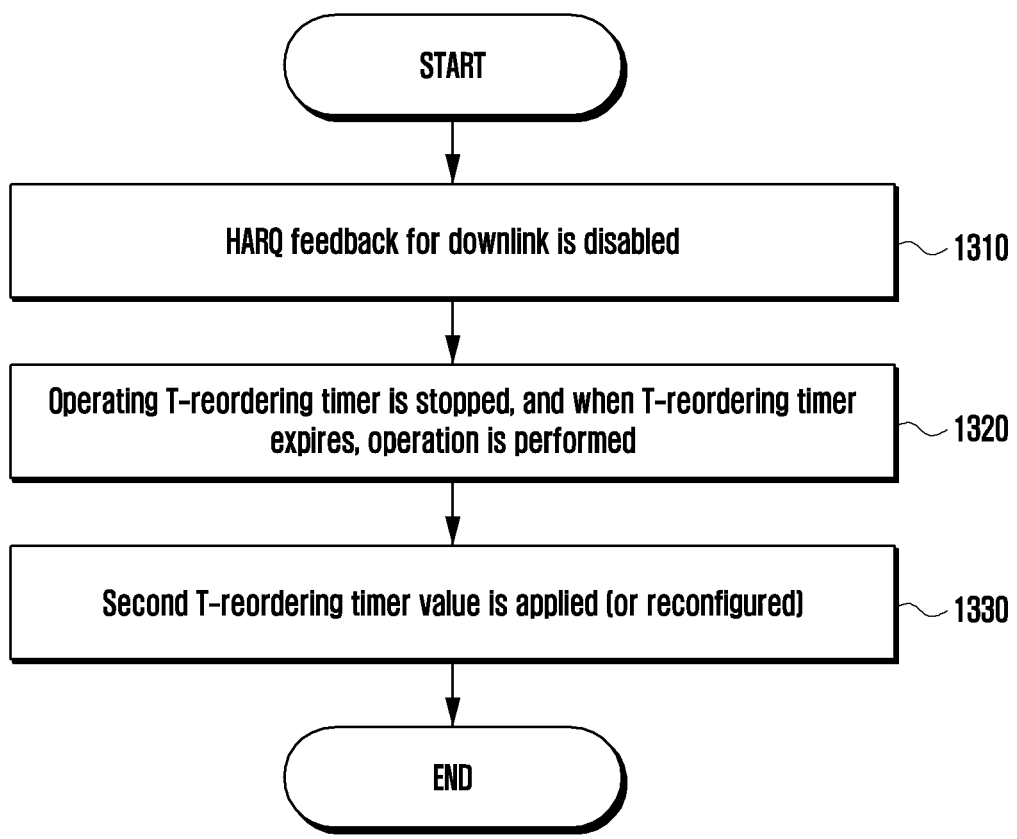
FIG. 13 is a flowchart illustrating a process of operating a packet data convergence protocol (PDCP) layer in case that HARQ feedback for downlink transmission is disabled according to an embodiment of the disclosure.

FIG. 13 is a flowchart illustrating a process of operating a packet data convergence protocol (PDCP) layer in case that HARQ feedback for downlink transmission is disabled according to an embodiment of the disclosure.

In the NTN, a long retransmission delay may be assumed due to a long propagation delay. A length of a T-reordering timer of a PDCP layer may be configured long due to such a long retransmission delay. However, in case that HARQ feedback for downlink transmission is disabled, retransmission with a long retransmission delay does not occur; thus, a long T-reordering timer length is not required, and a relatively short T-reordering timer length may be sufficient. In case that HARQ feedback for downlink transmission is disabled (1310), retransmission having a long retransmission delay may no longer occur. Therefore, in order to apply a shorter T-reordering timer length than the operating T-reordering timer, the operating T-reordering timer may be stopped, and in case that the T-reordering timer expires, an operation of the shorter T-reordering timer may be performed (1320).

In case that the T-reordering timer expires, the UE may have a COUNT value smaller than RX_REORD, or stored PDCP SDUs having continuous COUNT values after RX_REORD may be transmitted to an upper layer in ascending order after header compression is released. An RX_DELIV status variable may be updated with a COUNT value of a first PDCP SDU that has a COUNT value greater than or equal to RX_REORD and that has not been transferred to the upper layer. Thereafter, in case that the RX_DELIV value is smaller than RX_NEXT, the RX_REORD status variable may be updated with the RX_NEXT value and the T-reordering timer may be started.

In the embodiment of FIG. 13, it may be assumed that the UE has two T-reordering timer values. In case that HARQ feedback for downlink transmission is enabled, a first T-reordering timer value having a relatively long time length may be applied. In case that HARQ feedback for downlink transmission is disabled, a second T-reordering timer value having a relatively short time length may be applied. The first T-reordering timer value and the second T-reordering timer value may be transmitted by an RRC configuration message transmitted from the base station to the UE. Therefore, in the embodiment of FIG. 13, because it is assumed that HARQ feedback for downlink transmission is disabled, the second T-reordering timer value may be applied (or reconfigured) (1330).

Figure 14:
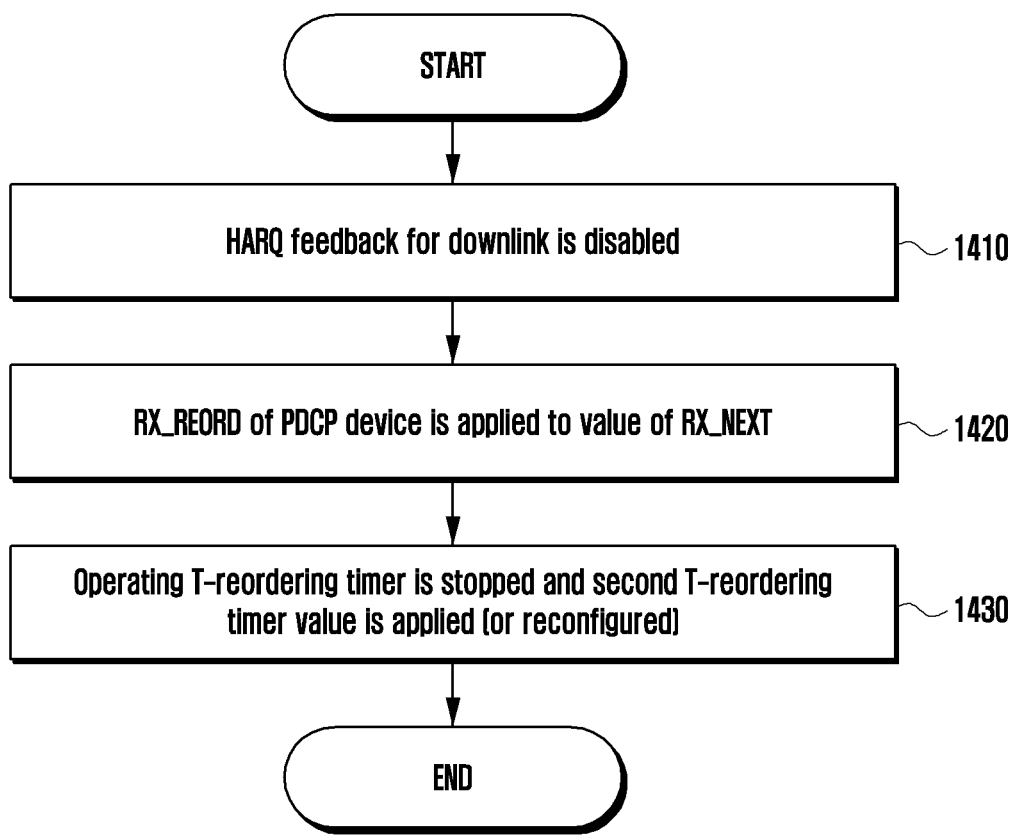
FIG. 14 is a flowchart illustrating a PDCP layer operation process in case that HARQ feedback for downlink transmission is disabled according to an embodiment of the disclosure.

FIG. 14 is a flowchart illustrating a PDCP layer operation process in case that HARQ feedback for downlink transmission is disabled according to an embodiment of the disclosure.

In the NTN, a long retransmission delay is assumed due to a long propagation delay, and a length of a T-reordering timer of the PDCP layer may be configured long due to such a long retransmission delay. However, in case that HARQ feedback for downlink transmission is disabled, retransmission with a long retransmission delay does not occur; thus, a long T-reordering timer length is not required and a relatively short T-reordering timer length may be sufficient. In case that HARQ feedback for downlink transmission is disabled (1410), retransmission having a long retransmission delay may no longer occur. Therefore, in order to apply a shorter T-reordering timer length than the operating T-reordering timer, RX_REORD, which is a status variable of a PDCP device, may be applied (updated) to a value of RX_NEXT (1420).

In the embodiment of FIG. 14, it may be assumed that the UE has two T-reordering timer values. In case that HARQ feedback for downlink transmission is enabled, a first T-reordering timer value having a relatively long time length may be applied. In case that HARQ feedback for downlink transmission is disabled, a second T-reordering timer value having a relatively short time length may be applied. The first T-reordering timer value and the second T-reordering timer value may be transmitted by an RRC configuration message transmitted from the base station to the UE. In the embodiment of FIG. 14, it is assumed that HARQ feedback for downlink transmission is disabled, and the operating T-reordering timer may be stopped and a second T-reordering timer value may be applied (or reconfigured) (1430).

Figure 15:
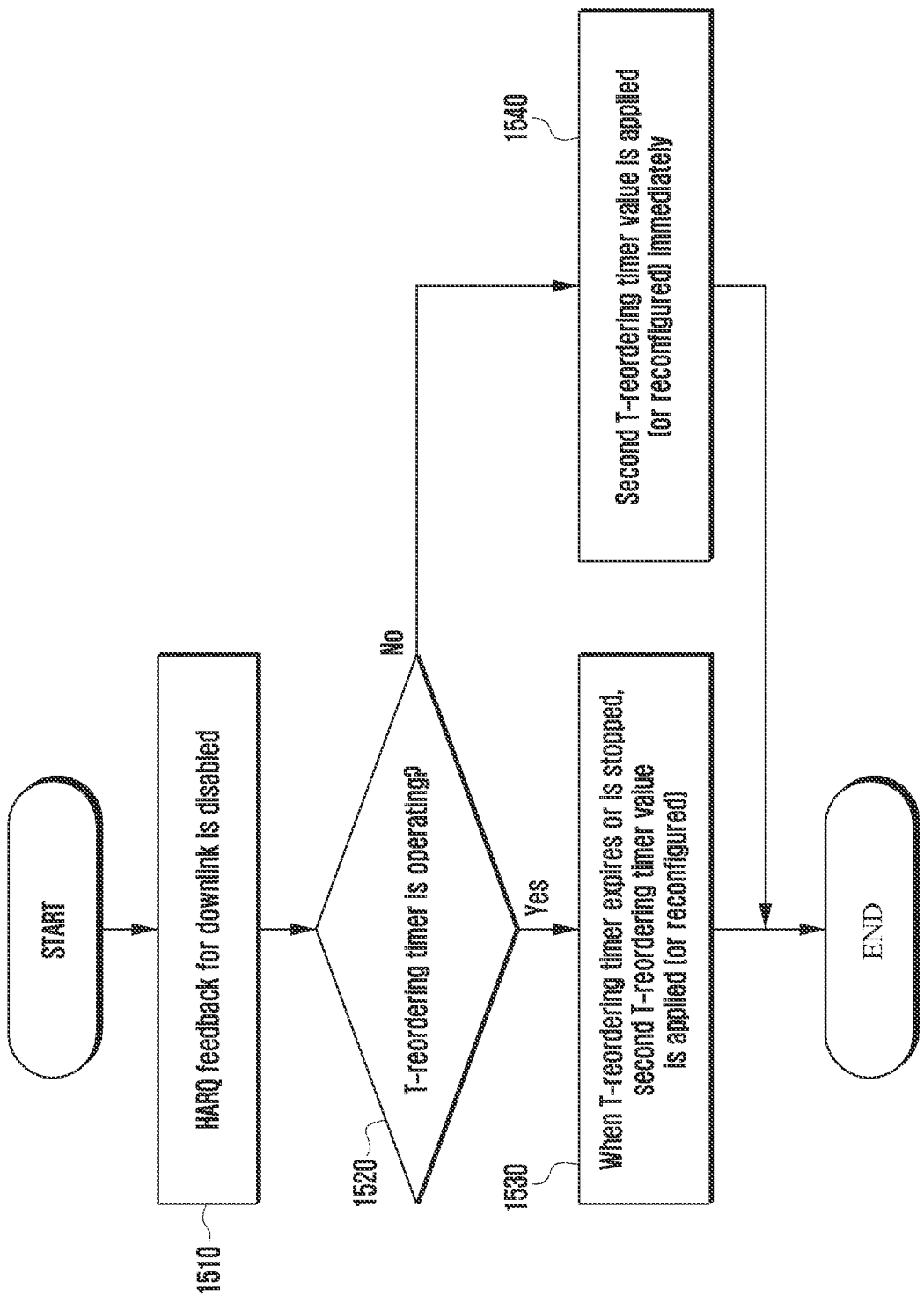
FIG. 15 is a flowchart illustrating a method of applying a T-reordering timer value in case that HARQ feedback for downlink transmission is disabled according to an embodiment of the disclosure.

FIG. 15 is a flowchart illustrating a method of applying a T-reordering timer value in case that HARQ feedback for downlink transmission is disabled according to an embodiment of the disclosure.

In the embodiment of FIG. 15, it may be assumed that the UE has two T-reordering timer values. In case that HARQ feedback for downlink transmission is enabled, a first T-reordering timer value having a relatively long time length may be applied. In case that HARQ feedback for downlink transmission is disabled, a second T-reordering timer value having a relatively short time length may be applied. The first T-reordering timer value and the second T-reordering timer value may be transmitted by an RRC configuration message transmitted from the base station to the UE. However, a time point at which the second T-reordering timer is applied may vary (1520) according to whether the T-reordering timer is operating at a time point at which HARQ feedback is disabled (1510). If the T-reordering timer is operating at a time point at which HARQ feedback for downlink transmission is disabled, in case that the operating T-reordering timer expires or is stopped, the second T-reordering timer value may be applied (or reconfigured) (1530). Otherwise, if the T-reordering timer is not operating at a time point at which HARQ feedback for downlink transmission is disabled, the second T-reordering timer value may be applied (or reconfigured) immediately (1540).

Figure 16:
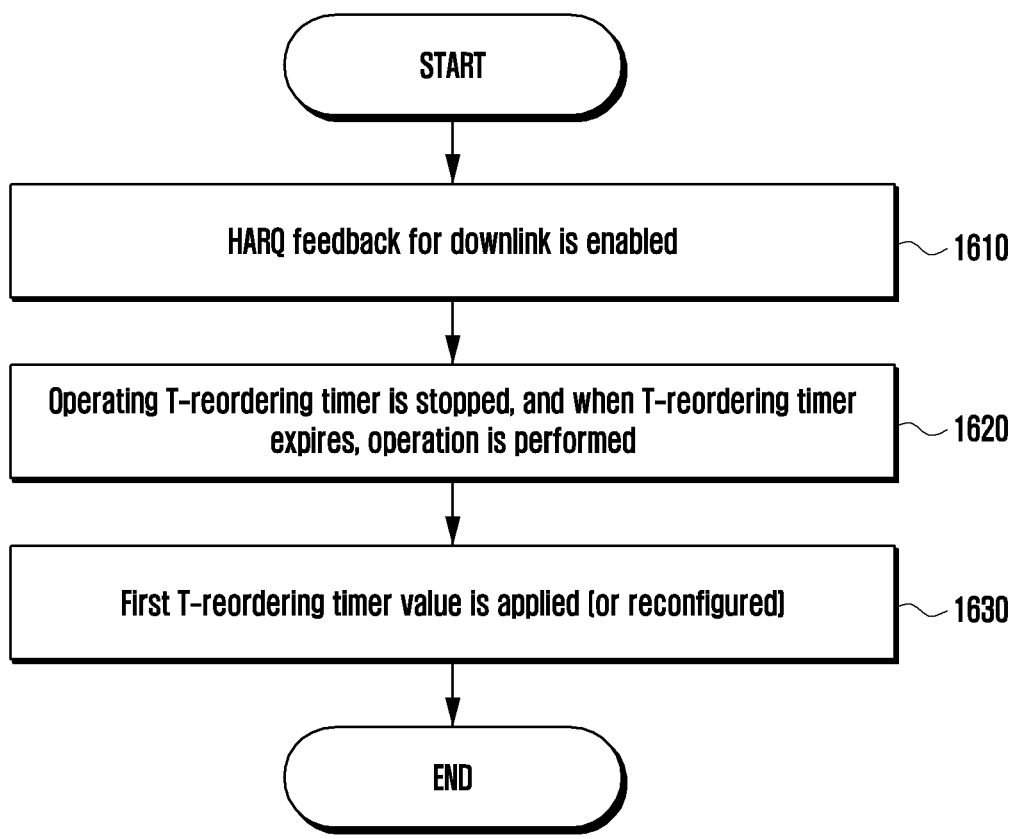
FIG. 16 is a flowchart illustrating a PDCP layer operation sequence in case that HARQ feedback for downlink transmission is enabled according to an embodiment of the disclosure.

FIG. 16 is a flowchart illustrating a PDCP layer operation sequence in case that HARQ feedback for downlink transmission is enabled according to an embodiment of the disclosure.

In the NTN, a long retransmission delay may be assumed due to a long propagation delay, and in case that HARQ feedback for downlink transmission is enabled due to such a long retransmission delay, a length of a T-reordering timer of a PDCP layer may be configured longer. However, in case that HARQ feedback for downlink transmission is disabled, retransmission with a long retransmission delay does not occur; thus, a long T-reordering timer length is not required, and a relatively short T-reordering timer length may be sufficient. In case that HARQ feedback for downlink transmission is enabled (1610), retransmission with a long retransmission delay may occur. Therefore, in order to apply a longer T-reordering timer length than the operating T-reordering timer, the operating T-reordering timer may be stopped, and in case that the T-reordering timer expires, an operation of the longer T-reordering timer may be performed (1620).

As an operation in case that the T-reordering timer expires, stored PDCP SDUs having a COUNT value smaller than RX_REORD or consecutive COUNT values after RX_REORD may be transferred to an upper layer in ascending order after header compression is released. An RX_DELIV status variable may be updated with a COUNT value of a first PDCP SDU that has a COUNT value greater than or equal to RX_REORD and that has not been transferred to the upper layer. Thereafter, in case that an RX_DELIV value is smaller than RX_NEXT, an RX_REORD status variable may be updated with an RX_NEXT value and the T-reordering timer may be started.

In the embodiment of FIG. 16, it may be assumed that the UE has two T-reordering timer values. In case that HARQ feedback for downlink transmission is enabled, a first T-reordering timer value having a relatively long time length may be applied. In case that HARQ feedback for downlink transmission is disabled, a second T-reordering timer value having a relatively short time length may be applied. The first T-reordering timer value and the second T-reordering timer value may be transmitted by an RRC configuration message transmitted from the base station to the UE. Therefore, in the embodiment of FIG. 16, because it is assumed that HARQ feedback for downlink transmission is enabled, the first T-reordering timer value may be applied (or reconfigured) (1630).

Figure 17:
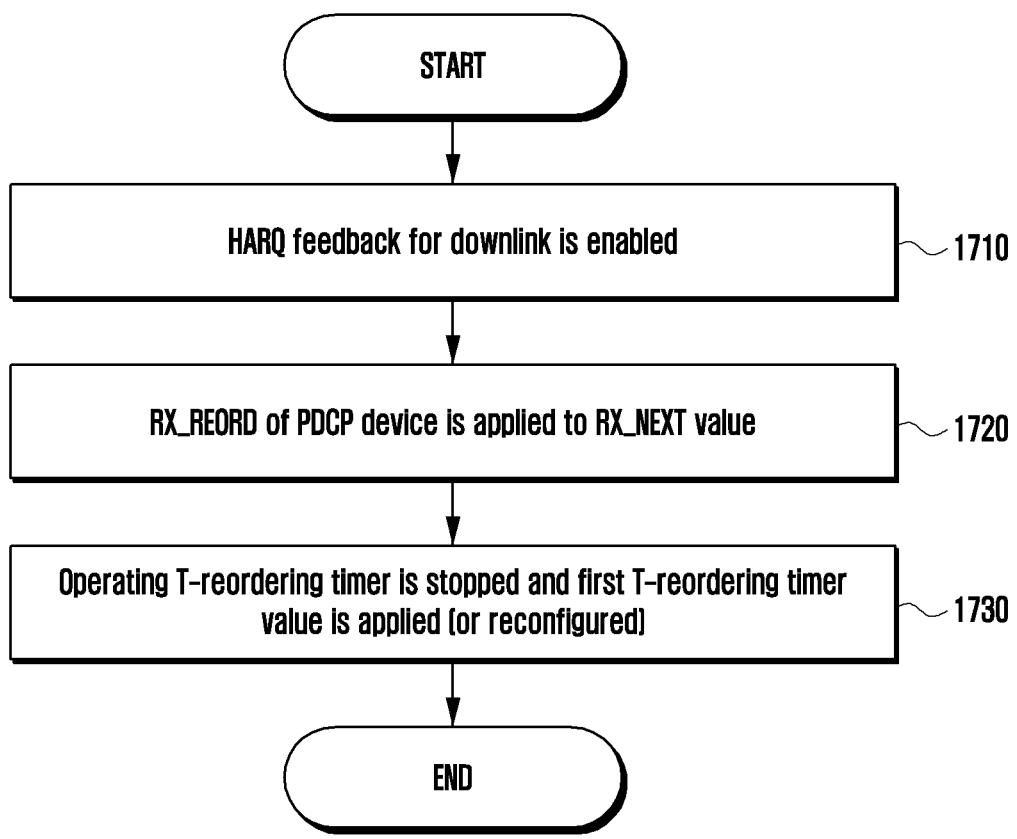
FIG. 17 is a flowchart illustrating a PDCP layer operation sequence in case that HARQ feedback for downlink transmission is enabled according to an embodiment of the disclosure.

FIG. 17 is a flowchart illustrating a PDCP layer operation sequence in case that HARQ feedback for downlink transmission is enabled according to an embodiment of the disclosure.

In the NTN, a long retransmission delay may be assumed due to a long propagation delay, and in case that HARQ feedback for downlink transmission is enabled due to such a long retransmission delay, a length of a T-reordering timer of a PDCP layer may be configured longer. However, in case that HARQ feedback for downlink transmission is disabled, retransmission with a long retransmission delay does not occur; thus, a long T-reordering timer length is not required and a relatively short T-reordering timer length may be sufficient. In case that HARQ feedback for downlink transmission is enabled (1710), retransmission with a long retransmission delay may occur. Accordingly, in order to apply a longer T-reordering timer length than the operating T-reordering timer, RX_REORD, which is a status variable of a PDCP device, may be applied (updated) as an RX_NEXT value (1720).

In the embodiment of FIG. 17, it may be assumed that the UE has two T-reordering timer values. In case that HARQ feedback for downlink transmission is enabled, a first T-reordering timer value having a relatively long time length may be applied. In case that HARQ feedback for downlink transmission is disabled, a second T-reordering timer value having a relatively short time length may be applied. The first T-reordering timer value and the second T-reordering timer value may be transmitted by an RRC configuration message transmitted from the base station to the UE. In the embodiment of FIG. 17, it is assumed that HARQ feedback for downlink transmission is enabled, and the operating T-reordering timer may be stopped and a first T-reordering timer value may be applied (or reconfigured) (1730).

Figure 18:
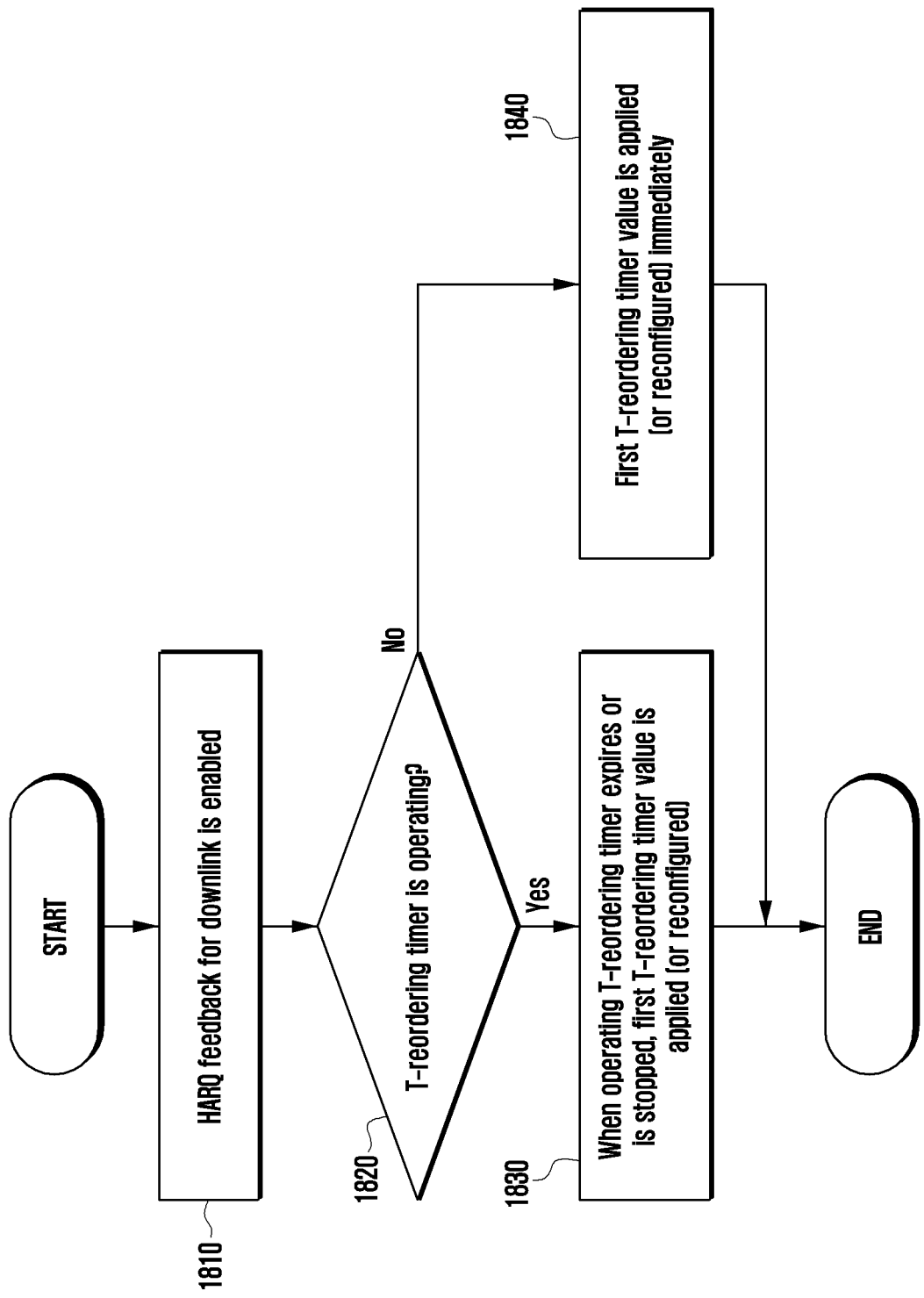
FIG. 18 is a flowchart illustrating a method of applying a T-reordering timer value in case that HARQ feedback for downlink transmission is enabled according to an embodiment of the disclosure.

FIG. 18 is a flowchart illustrating a method of applying a T-reordering timer value in case that HARQ feedback for downlink transmission is enabled according to an embodiment of the disclosure.

In the embodiment of FIG. 18, it may be assumed that the UE has two T-reordering timer values. In case that HARQ feedback for downlink transmission is enabled, a first T-reordering timer value having a relatively long time length may be applied. In case that HARQ feedback for downlink transmission is disabled, a second T-reordering timer value having a relatively short time length may be applied. The first T-reordering timer value and the second T-reordering timer value may be transmitted by an RRC configuration message transmitted from the base station to the UE. However, a time point at which the first T-reordering timer is applied may vary (1820) according to whether the T-reordering timer is operating at a time point at which HARQ feedback is enabled (1810). If the T-reordering timer is operating at a time point at which HARQ feedback for downlink transmission is enabled, in case that the operating T-reordering timer expires or is stopped, the first T-reordering timer value may be applied (or reconfigured) (1830). Otherwise, if the T-reordering timer is not operating at a time point at which HARQ feedback for downlink transmission is enabled, the first T-reordering timer value may be applied (or reconfigured) immediately (1840).

Figure 19:
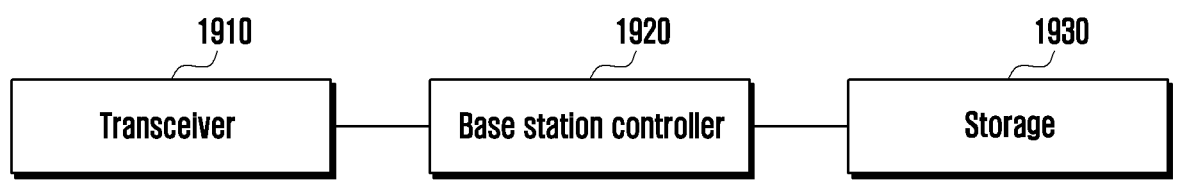
FIG. 19 is a block diagram illustrating an internal structure of a base station according to an embodiment of the disclosure.

FIG. 19 is a block diagram illustrating an internal structure of a base station according to an embodiment of the disclosure.

With reference to FIG. 19, the base station may include a transceiver 1910, a controller 1920, and a storage 1930. In the disclosure, the controller 1920 may be defined as a circuit, an application-specific integrated circuit, or at least one processor. The transceiver 1910 may transmit and receive signals to and from other network entities. For example, the transceiver 1910 may transmit system information to the UE and transmit a synchronization signal or a reference signal. The controller 1920 may control overall operations of the base station according to the embodiment proposed in the disclosure. For example, the controller 1920 may control signal flow between blocks to perform an operation according to the flowchart described above. The storage 1930 may store at least one of information transmitted and received through the transceiver 1910 or information generated through the controller 1920.

Figure 20:
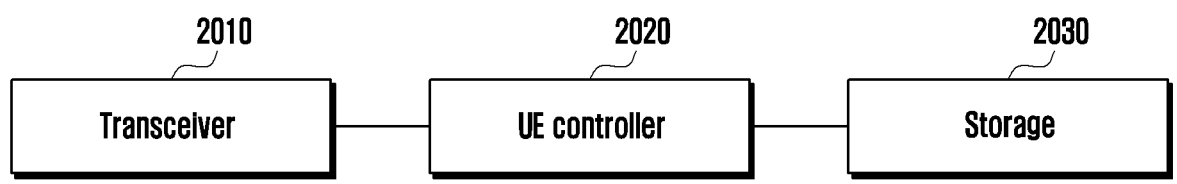
FIG. 20 is a block diagram illustrating an internal structure of a terminal according to an embodiment of the disclosure.

FIG. 20 is a block diagram illustrating an internal structure of a UE according to an embodiment of the disclosure.

With reference to FIG. 20, the UE may include a transceiver 2010, a controller 2020, and a storage 2030. In the disclosure, the controller may be defined as a circuit, an application-specific integrated circuit, or at least one processor. The transceiver 2010 may transmit and receive signals to and from other network entities. For example, the transceiver 2010 may receive system information from the base station and receive a synchronization signal or a reference signal. The controller 2020 may control the overall operation of the UE according to the embodiment proposed in the disclosure. For example, the controller 2020 may control signal flow between blocks to perform an operation according to the flowchart described above. The storage 2030 may store at least one of information transmitted and received through the transceiver 2010 or information generated through the controller 2020.

The invention claimed is:

1. A method performed by a terminal of a wireless communication system, the method comprising:
    receiving, from a base station, a message including information on whether a hybrid automatic repeat request (HARQ) feedback is activated;
    identifying whether the information is activation information or deactivation information; and
    configuring, in case that the information is the deactivation information, a first timer and a second timer of a radio link control (RLC) layer,
    wherein the first timer and the second timer are related to a reassembly timer of a packet, and wherein the first timer is greater than or equal to the second timer.

2. The method of claim 1, wherein configuring the first timer and the second timer of the RLC layer comprises stopping the first timer and configuring the first timer to expire.

3. The method of claim 1, wherein configuring a first timer and a second timer of the RLC layer comprises stopping the first timer and configuring the second timer to operate.

4. The method of claim 1, wherein the information on whether the HARQ feedback is activated is a medium access control-control element (MAC CE) format or a downlink control information (DCI) format.

5. The method of claim 1, wherein the information on whether the HARQ feedback is activated is information configured per each HARQ process.

6. A method performed by a terminal of a wireless communication system, the method comprising:
 receiving, from a base station, a message including information on whether a hybrid automatic repeat request (HARQ) feedback is activated;
 identifying whether the information is activation information or deactivation information; and
 configuring, in case that the information is the deactivation information, a first timer and a second timer of a packet data convergence protocol (PDCP) layer,
 wherein the first timer and the second timer are related to a reordering timer of a packet, and
 wherein the first timer is greater than or equal to the second timer.

7. The method of claim 6, wherein configuring the first timer and the second timer of the PDCP layer comprises stopping the first timer and configuring the first timer to expire.

8. The method of claim 6, wherein configuring a first timer and a second timer of the PDCP layer comprises stopping the first timer and configuring the second timer to operate.

9. The method of claim 6, wherein the information on whether the HARQ feedback is activated is a medium access control-control element (MAC CE) format or a downlink control information (DCI) format.

10. The method of claim 6, wherein the information on whether the HARQ feedback is activated is information configured per each HARQ process.

11. A terminal of a wireless communication system, the terminal comprising:
 a transceiver; and
 a controller configured to:
  control to receive, from a base station via the transceiver, a message including information on whether a hybrid automatic repeat request (HARQ) feedback is activated,
  identify whether the information is activation information or deactivation information, and
  configure a first timer and a second timer of a radio link control (RLC) layer in case that the information is the deactivation information,
 wherein the first timer and the second timer are related to a reassembly timer of a packet, and
 wherein the first timer is greater than or equal to the second timer.

12. The terminal of claim 11, wherein the controller configured to configure the first timer and the second timer of the RLC layer is configured to stop the first timer and to configure the first timer to expire.

13. The terminal of claim 11, wherein the controller configured to configure the first timer and the second timer of the RLC layer is configured to stop the first timer and to operate the second timer.

14. The terminal of claim 11, wherein the information on whether the HARQ feedback is activated is a medium access control-control element (MAC CE) format or a downlink control information (DCI) format.

15. The terminal of claim 11, wherein the information on whether the HARQ feedback is activated is information configured per each HARQ process.

* * * * *